US008810546B1

(12) United States Patent  
Kremin et al.

(10) Patent No.: US 8,810,546 B1  
(45) Date of Patent: Aug. 19, 2014

(54) TOUCHSCREEN PANEL FREQUENCY RESPONSE DETERMINATION

(71) Applicant: Cypress Semiconductor Corporation, San Jose, CA (US)

(72) Inventors: Victor Kremin, Lviv (UA); Oleksandr Pirogov, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 13/902,805

(22) Filed: May 25, 2013

Related U.S. Application Data

(60) Provisional application No. 61/730,703, filed on Nov. 28, 2012, provisional application No. 61/706,032, filed on Sep. 26, 2012.

(51) Int. Cl.
  *G06F 3/045* (2006.01)
  *G06F 3/044* (2006.01)
(52) U.S. Cl.
  CPC ..................................... *G06F 3/044* (2013.01)
  USPC ......................................................... 345/174
(58) Field of Classification Search
  USPC ..................... 345/173–183; 178/18.01–19.03
  See application file for complete search history.

(56) References Cited

U.S. PATENT DOCUMENTS

| 5,008,497 | A | 4/1991 | Asher |
| 7,830,157 | B2 | 11/2010 | Geaghan |
| 2010/0265191 | A1* | 10/2010 | Mui et al. ........................ 345/173 |
| 2010/0328228 | A1 | 12/2010 | Elias |
| 2011/0115729 | A1 | 5/2011 | Konovalov |
| 2011/0267309 | A1 | 11/2011 | Hanauer |
| 2011/0267310 | A1* | 11/2011 | Tsukahara et al. ............ 345/174 |
| 2012/0113047 | A1 | 5/2012 | Hanauer |
| 2012/0293446 | A1 | 11/2012 | Crandall |
| 2013/0069909 | A1 | 3/2013 | Hsueh |
| 2013/0076675 | A1 | 3/2013 | Shin |

OTHER PUBLICATIONS

Shuwen Cao, Tim Hill, Melissa Lau, Andy Yee, Keyboard Integrated Trackpad Efficiency Solution: MDR Report, Dec. 10, 2012, 13 pages.
Patentability Search for "Method Of Touch Screen Panel Time Constant Determination", dated May 2013, 29 pages.

* cited by examiner

*Primary Examiner* — Rodney Amadiz
(74) *Attorney, Agent, or Firm* — Lowenstein Sandler LLP

(57) ABSTRACT

Apparatuses and methods of frequency-response calculation are described. One method measures a charge on an electrode of a touch panel by a capacitance-sensing circuit of a processing device. The processing device measures a frequency response of the touch panel and selects an operating frequency of the touch panel in view of the frequency response.

18 Claims, 16 Drawing Sheets

TOUCHSCREEN PANEL FREQUENCY RESPONSE DETERMINATION

RELATED APPLICATIONS

This application claims the benefit of U.S. Provisional Application No. 61/730,703, filed Nov. 28, 2012, and claims the benefit of U.S. Provisional Application No. 61/706,032, filed Sep. 26, 2012, the entire contents of which are incorporated by reference herein.

TECHNICAL FIELD

The present disclosure relates generally to sensing systems, and more particularly to capacitance-sensing systems configurable to frequency-response calculation on the capacitive-sensing systems.

BACKGROUND

Capacitance sensing systems can sense electrical signals generated on electrodes that reflect changes in capacitance. Such changes in capacitance can indicate a touch event (i.e., the proximity of an object to particular electrodes). Capacitive sense elements may be used to replace mechanical buttons, knobs and other similar mechanical user interface controls. The use of a capacitive sense element allows for the elimination of complicated mechanical switches and buttons, providing reliable operation under harsh conditions. In addition, capacitive sense elements are widely used in modern customer applications, providing new user interface options in existing products. Capacitive sense elements can range from a single button to a large number arranged in the form of a capacitive sense array for a touch-sensing surface.

Transparent touch screens that utilize capacitive sense arrays are ubiquitous in today's industrial and consumer markets. They can be found on cellular phones, GPS devices, set-top boxes, cameras, computer screens, MP3 players, digital tablets, and the like. The capacitive sense arrays work by measuring the capacitance of a capacitive sense element, and looking for a delta in capacitance indicating a touch or presence of a conductive object. When a conductive object (e.g., a finger, hand, or other object) comes into contact or close proximity with a capacitive sense element, the capacitance changes and the conductive object is detected. The capacitance changes of the capacitive touch sense elements can be measured by an electrical circuit. The electrical circuit converts the measured capacitances of the capacitive sense elements into digital values.

There are two typical types of capacitance: 1) mutual capacitance where the capacitance-sensing circuit has access to both electrodes of the capacitor; 2) self-capacitance where the capacitance-sensing circuit has only access to one electrode of the capacitor where the second electrode is tied to a DC voltage level or is parasitically coupled to Earth Ground. A touch panel has a distributed load of capacitance of both types (1) and (2) and Cypress' touch solutions sense both capacitances either uniquely or in hybrid form with its various sense modes.

BRIEF DESCRIPTION OF THE DRAWINGS

The present invention is illustrated by way of example, and not of limitation, in the figures of the accompanying drawings.

DETAILED DESCRIPTION

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

The embodiments described herein are directed to frequency-response calculation, such as a time-constant calculation. One apparatus includes a processing device configurable to calculate a time constant of a touch panel coupled to the processing device. The processing device includes a capacitance-sensing circuit to measure signals from the touch panel and a frequency-response calculator configured to measure a frequency response of the touch panel. The processing device selects an operating frequency of the touch panel in view of the measured frequency response. In one embodiment, the frequency-response calculator includes a time-constant calculator configured to vary window durations during which the capacitance-sensing circuit measures the signals from the touch panel. There is a dependence between a charge measured by the capacitance-sensing circuit and the window duration. In some cases the dependence is exponential. The time-constant calculator is further configured to calculate the time constant from the measured charge within the varied window durations. The time constant of touch panels is one of the key parameters in touch sensing designs. Using the embodiments described herein for run time measurements of the time constant may permit a touchscreen controller to select an optimal set of scanning frequencies for the touch panels' resistive-capacitive (RC) properties. The embodiments described herein may be also be used as a manufacturing test of touch panels, as well as a self-test of assembled units in which measured time constants may be compared with expected values. These embodiments do not utilize external measurement equipment and signals to determine the time constant of a touch panel.

Figure 1:
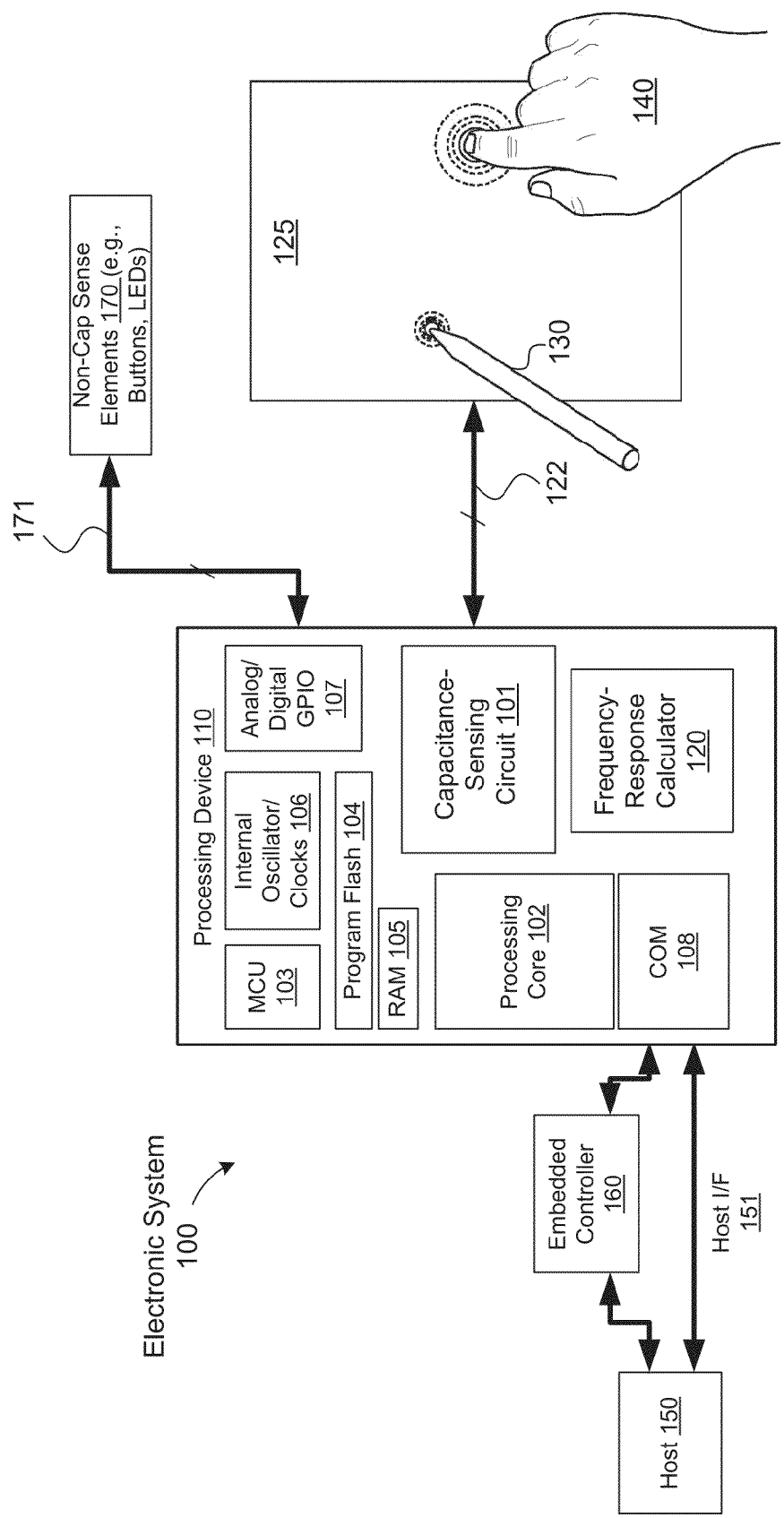
FIG. 1 is a block diagram illustrating one embodiment of an electronic system having a processing device comprising a frequency-response calculator.

FIG. 1 is a block diagram illustrating one embodiment of an electronic system 100 having a processing device 110 including a frequency-response calculator 120. The frequency-response calculator 120 measures a frequency response of a touch panel, such as the capacitive sense array 125 as described herein. The processing device 110 selects an operating frequency in view of the measured frequency response. The operating frequency can be the maximum operating frequency used by the capacitance-sensing circuit to measure capacitance on the touch panel. The frequency response of the touch panel can be measured in various manners. For example, a time-constant calculator can be used to measure a time-constant of the touch panel by varying windows in which the signals from the touch panel are measured. Details regarding the frequency-response calculator 120 are described in more detail with respect to FIGS. 3-9. In other embodiments, two or more samples measurement can be made at different points to approximate the frequency response of the touch panel. In another embodiment, a rate of change can be calculated to approximate the frequency response of the touch panel.

The processing device 110 is configured to detect one or more touches on a touch-sensing device, such as the capacitive sense array 125. The processing device can detect conductive objects, such as touch objects 140 (fingers or passive styluses), an active stylus 130, or any combination thereof. The capacitance-sensing circuit 101 can measure touch data on the capacitive sense array 125. The touch data may be represented as multiple cells, each cell representing an intersection of sense elements (e.g., electrodes) of the capacitive sense array 125. In another embodiment, the touch data is a 2D capacitive image of the capacitive sense array 125. In one embodiment, when the capacitance-sensing circuit 101 measures mutual capacitance of the touch-sensing device (e.g., capacitive sense array 125), the capacitance-sensing circuit 101 obtains a 2D capacitive image of the touch-sensing device and processes the data for peaks and positional information. In another embodiment, the processing device 110 is a microcontroller that obtains a capacitance touch signal data set, such as from a sense array, and finger detection firmware executing on the microcontroller identifies data set areas that indicate touches, detects and processes peaks, calculates the coordinates, or any combination therefore. The firmware identifies the peaks using the embodiments described herein. The firmware can calculate a precise coordinate for the resulting peaks. In one embodiment, the firmware can calculate the precise coordinates for the resulting peaks using a centroid algorithm, which calculates a centroid of the touch, the centroid being a center of mass of the touch. The centroid may be an X/Y coordinate of the touch. Alternatively, other coordinate interpolation algorithms may be used to determine the coordinates of the resulting peaks. The microcontroller can report the precise coordinates to a host processor, as well as other information.

Electronic system 100 includes processing device 110, capacitive sense array 125, stylus 130, host processor 150, embedded controller 160, and non-capacitive sense elements 170. The capacitive sense elements are electrodes of conductive material, such as copper. The sense elements may also be part of an ITO panel. The capacitive sense elements can be configurable to allow the capacitive-sensing circuit 101 to measure self capacitance, mutual capacitance, or any combination thereof. Self-capacitance scanning is a method of detecting the presence of a conductive object by measuring the relative capacitance to ground. For example, using self-capacitance scanning, every row and column is scanned individually resulting in R+C scans. Mutual-capacitance scanning is a method of detecting the presence of a conductive object by measuring the relative capacitance between two electrodes (transmit (TX) electrodes and receive (RX) electrodes). For example, using mutual-capacitance scanning, each intersection (TX/RX intersection) is scanned. However, in some cases, the RX electrodes can be grouped together, resulting in NumRXGroups*TX scans. In the depicted embodiment, the electronic system 100 includes the capacitive sense array 125 coupled to the processing device 110 via bus 122. The capacitive sense array 125 may include a multi-dimension capacitive sense array. The multi-dimension sense array includes multiple sense elements, organized as rows and columns. In another embodiment, the capacitive sense array 125 operates as an all-points-addressable ("APA") mutual capacitive sense array. In another embodiment, the capacitive sense array 125 operates as a coupled-charge receiver. In another embodiment, the capacitive sense array 125 is non-transparent capacitive sense array (e.g., PC touchpad). The capacitive sense array 125 may be disposed to have a flat surface profile. Alternatively, the capacitive sense array 125 may have non-flat surface profiles. Alternatively, other configurations of capacitive sense arrays may be used. For example, instead of vertical columns and horizontal rows, the capacitive sense array 125 may have a hexagon arrangement, or the like, as would be appreciated by one of ordinary skill in the art having the benefit of this disclosure. In one embodiment, the capacitive sense array 125 may be included in an ITO panel or a touch screen panel.

The operations and configurations of the processing device 110 and the capacitive sense array 125 for detecting and tracking the touch object 140 and stylus 130 are described herein. In short, the processing device 110 is configurable to detect a presence of the touch object 140, a presence of a stylus 130 on the capacitive sense array 125, or any combination thereof. The processing device 110 may detect and track the stylus 130 and the touch object 140 individually on the capacitive sense array 125. In one embodiment, the processing device 110 can detect and track both the stylus 130 and touch object 140 concurrently on the capacitive sense array 125. If the touching object is an active stylus, in one embodiment, the active stylus 130 is configurable to operate as the timing "master," and the processing device 110 adjusts the timing of the capacitive sense array 125 to match that of the active stylus 130 when the active stylus 130 is in use. In one embodiment, the capacitive sense array 125 capacitively couples with the active stylus 130, as opposed to conventional inductive stylus applications. It should also be noted that the same assembly used for the capacitive sense array 125, which is configurable to detect touch objects 140, is also used to detect and track a stylus 130 without an additional PCB layer for inductively tracking the active stylus 130.

In the depicted embodiment, the processing device 110 includes analog and/or digital general purpose input/output ("GPIO") ports 107. GPIO ports 107 may be programmable. GPIO ports 107 may be coupled to a Programmable Interconnect and Logic ("PIL"), which acts as an interconnect between GPIO ports 107 and a digital block array of the processing device 110 (not shown). The digital block array may be configurable to implement a variety of digital logic circuits (e.g., DACs, digital filters, or digital control systems) using, in one embodiment, configurable user modules ("UMs"). The digital block array may be coupled to a system bus. Processing device 110 may also include memory, such as random access memory ("RAM") 105 and program flash 104. RAM 105 may be static RAM ("SRAM"), and program flash 104 may be a non-volatile storage, which may be used to store firmware (e.g., control algorithms executable by processing core 102 to implement operations described herein). Processing device 110 may also include a memory controller unit ("MCU") 103 coupled to memory and the processing core 102. The processing core 102 is a processing element configured to execute instructions or perform operations. The processing device 110 may include other processing elements as would be appreciated by one of ordinary skill in the art having the benefit of this disclosure. It should also be noted that the memory may be internal to the processing device or external to it. In the case of the memory being internal, the memory may be coupled to a processing element, such as the processing core 102. In the case of the memory being external to the processing device, the processing device is coupled to the other device in which the memory resides as would be appreciated by one of ordinary skill in the art having the benefit of this disclosure.

The processing device 110 may also include an analog block array (not shown). The analog block array is also coupled to the system bus. Analog block array may also be configurable to implement a variety of analog circuits (e.g., ADCs or analog filters) using, in one embodiment, configurable UMs. The analog block array may also be coupled to the GPIO 107.

As illustrated, capacitance-sensing circuit 101 may be integrated into processing device 110. Capacitance-sensing circuit 101 may include analog I/O for coupling to an external component, such as touch-sensor pad (not shown), capacitive sense array 125, touch-sensor slider (not shown), touch-sensor buttons (not shown), and/or other devices. The capacitance-sensing circuit 101 may be configurable to measure capacitance using mutual-capacitance sensing techniques, self-capacitance sensing technique, charge coupling techniques or the like. In one embodiment, capacitance-sensing circuit 101 operates using a charge accumulation circuit, a capacitance modulation circuit, or other capacitance sensing methods known by those skilled in the art. In an embodiment, the capacitance-sensing circuit 101 is of the Cypress TMA-3xx, TMA-4xx, or TMA-xx families of touch screen controllers. Alternatively, other capacitance-sensing circuits may be used. The mutual capacitive sense arrays, or touch screens, as described herein, may include a transparent, conductive sense array disposed on, in, or under either a visual display itself (e.g. LCD monitor), or a transparent substrate in front of the display. In an embodiment, the TX and RX electrodes are configured in rows and columns, respectively. It should be noted that the rows and columns of electrodes can be configured as TX or RX electrodes by the capacitance-sensing circuit 101 in any chosen combination. In one embodiment, the TX and RX electrodes of the sense array 125 are configurable to operate as a TX and RX electrodes of a mutual capacitive sense array in a first mode to detect touch objects, and to operate as electrodes of a coupled-charge receiver in a second mode to detect a stylus on the same electrodes of the sense array. The stylus, which generates a stylus TX signal when activated, is used to couple charge to the capacitive sense array, instead of measuring a mutual capacitance at an intersection of a RX electrode and a TX electrode (a sense element) as done during mutual-capacitance sensing. An intersection between two sense elements may be understood as a location at which one sense electrode crosses over or overlaps another, while maintaining galvanic isolation from each other. The capacitance-sensing circuit 101 does not use mutual-capacitance or self-capacitance sensing to measure capacitances of the sense elements when performing a stylus sensing. Rather, the capacitance-sensing circuit 101 measures a charge that is capacitively coupled between the sense array 125 and the stylus as described herein. The capacitance associated with the intersection between a TX electrode and an RX electrode can be sensed by selecting every available combination of TX electrode and RX electrode. When a touch object, such as a finger or stylus, approaches the capacitive sense array 125, the object causes a decrease in mutual capacitance between some of the TX/RX electrodes. In another embodiment, the presence of a finger increases the coupling capacitance of the electrodes. Thus, the location of the finger on the capacitive sense array 125 can be determined by identifying the RX electrode having a decreased coupling capacitance between the RX electrode and the TX electrode to which the TX signal was applied at the time the decreased capacitance was measured on the RX electrode. Therefore, by sequentially determining the capacitances associated with the intersection of electrodes, the locations of one or more inputs can be determined. It should be noted that the process can calibrate the sense elements (intersections of RX and TX electrodes) by determining baselines for the sense elements. It should also be noted that interpolation may be used to detect finger position at better resolutions than the row/column pitch as would be appreciated by one of ordinary skill in the art having the benefit of this disclosure. In addition, various types of coordinate interpolation algorithms may be used to detect the center of the touch as would be appreciated by one of ordinary skill in the art having the benefit of this disclosure.

In an embodiment, the electronic system 100 may also include non-capacitive sense elements 170 coupled to the processing device 110 via bus 171 and GPIO port 107. The non-capacitive sense elements 170 may include buttons, light emitting diodes ("LEDs"), and other user interface devices, such as a mouse, a keyboard, or other functional keys that do not use capacitance sensing. In one embodiment, buses 122, and 171 are embodied in a single bus. Alternatively, these buses may be configured into any combination of one or more separate buses.

Processing device 110 may include internal oscillator/clocks 106 and communication block ("COM") 108. In another embodiment, the processing device 110 includes a spread spectrum clock (not shown). The oscillator/clocks block 106 provides clock signals to one or more of the components of processing device 110. Communication block 108 may be used to communicate with an external component, such as a host processor 150, via host interface ("I/F") line 151. Alternatively, processing device 110 may also be coupled to embedded controller 160 to communicate with the external components, such as host processor 150. In one embodiment, the processing device 110 is configurable to communicate with the embedded controller 160 or the host processor 150 to send and/or receive data.

Processing device 110 may reside on a common carrier substrate such as, for example, an integrated circuit ("IC") die substrate, a multi-chip module substrate, or the like. Alternatively, the components of processing device 110 may be one or more separate integrated circuits and/or discrete components. In one exemplary embodiment, processing device 110 is the Programmable System on a Chip (PSoC®) processing device, developed by Cypress Semiconductor Corporation, San Jose, Calif. Alternatively, processing device 110 may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like.

It should also be noted that the embodiments described herein are not limited to having a configuration of a processing device coupled to a host, but may include a system that measures the capacitance on the sensing device and sends the raw data to a host computer where it is analyzed by an application. In effect, the processing that is done by processing device 110 may also be done in the host.

Capacitance-sensing circuit 101 may be integrated into the IC of the processing device 110, or alternatively, in a separate IC. Alternatively, descriptions of capacitance-sensing circuit 101 may be generated and compiled for incorporation into other integrated circuits. For example, behavioral level code describing the capacitance-sensing circuit 101, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout may represent various levels of abstraction to describe capacitance-sensing circuit 101.

It should be noted that the components of electronic system 100 may include all the components described above. Alternatively, electronic system 100 may include some of the components described above.

In one embodiment, the electronic system 100 is used in a tablet computer. Alternatively, the electronic device may be used in other applications, such as a notebook computer, a mobile handset, a personal data assistant ("PDA"), a keyboard, a television, a remote control, a monitor, a handheld multi-media device, a handheld media (audio and/or video) player, a handheld gaming device, a signature input device for point of sale transactions, an eBook reader, global position system ("GPS") or a control panel. The embodiments described herein are not limited to touch screens or touch-sensor pads for notebook implementations, but can be used in other capacitive sensing implementations, for example, the sensing device may be a touch-sensor slider (not shown) or touch-sensor buttons (e.g., capacitance sensing buttons). In one embodiment, these sensing devices include one or more capacitive sensors or other types of capacitance-sensing circuitry. The operations described herein are not limited to notebook pointer operations, but can include other operations, such as lighting control (dimmer), volume control, graphic equalizer control, speed control, or other control operations requiring gradual or discrete adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc.) handwriting recognition, and numeric keypad operation.

Touchscreen panels, due to manufacturing, have large variations in time constants from unit to unit. The time constant ($\tau = R \times C$) is a parameter of the touchscreen panel that characterizes the response to a step input. A capacitive touchscreen panel includes an insulator such as glass, coated with a transparent conductor such as indium tin oxide (ITO). The conductor has a resistance R and a capacitance (C). As described herein, the capacitive touchscreen panel includes multiple electrodes that are typically laid out in rows and columns. A column or columns of electrodes could be driven with a TX signal and a row or rows of electrodes could be used to measure a corresponding RX signal. The capacitance at an intersection (also called a sensor) between the TX electrode and the RX electrode can be measured. When a conductive object (e.g., finger) is proximate to the intersection, the capacitance between the TX electrode and the RX electrode changes and the change can be measured to detect a conductive object proximate to the touchscreen panel. The father away from the TX signal source, the more electrodes can add capacitance and resistance, which increases the time constant of a sensor that is farther away from the TX signal source as compared to the time constant of a sensor that is closer to the TX signal source. The father away from the RX sensing input, the more electrodes can add capacitance and resistance, which increases the time constant of a sensor that is farther away from the RX sensing input as compared to the time constant of a sensor that is closer to the RX sensing input. Overall time constant of the particular TX-RX intersection is defined by the total signal path from the TX signal source to the intersection and from the intersection to the RX sensing input. Sensor time constant is one of the key parameters in touch-sensing designs. Conventionally, time constants of a touchscreen panel are measured manually as described below with respect to FIG. 2. Run-time measuring of time constants by the touchscreen controller permits the touchscreen controller to select an optimal set of scanning frequencies for the panel's RC properties of which are not known and which may have large variations from unit to unit due to manufacturing. The embodiments described herein can be used a manufacturing test of touch panels. The embodiments described herein can also be used for self-tests of assembled units in which measured time constants can be compared with expected values. It should be noted that various embodiments are described in relation to touchscreen panels. However, the embodiments described herein can be used in other touch panels.

Figures 2A, 2B:
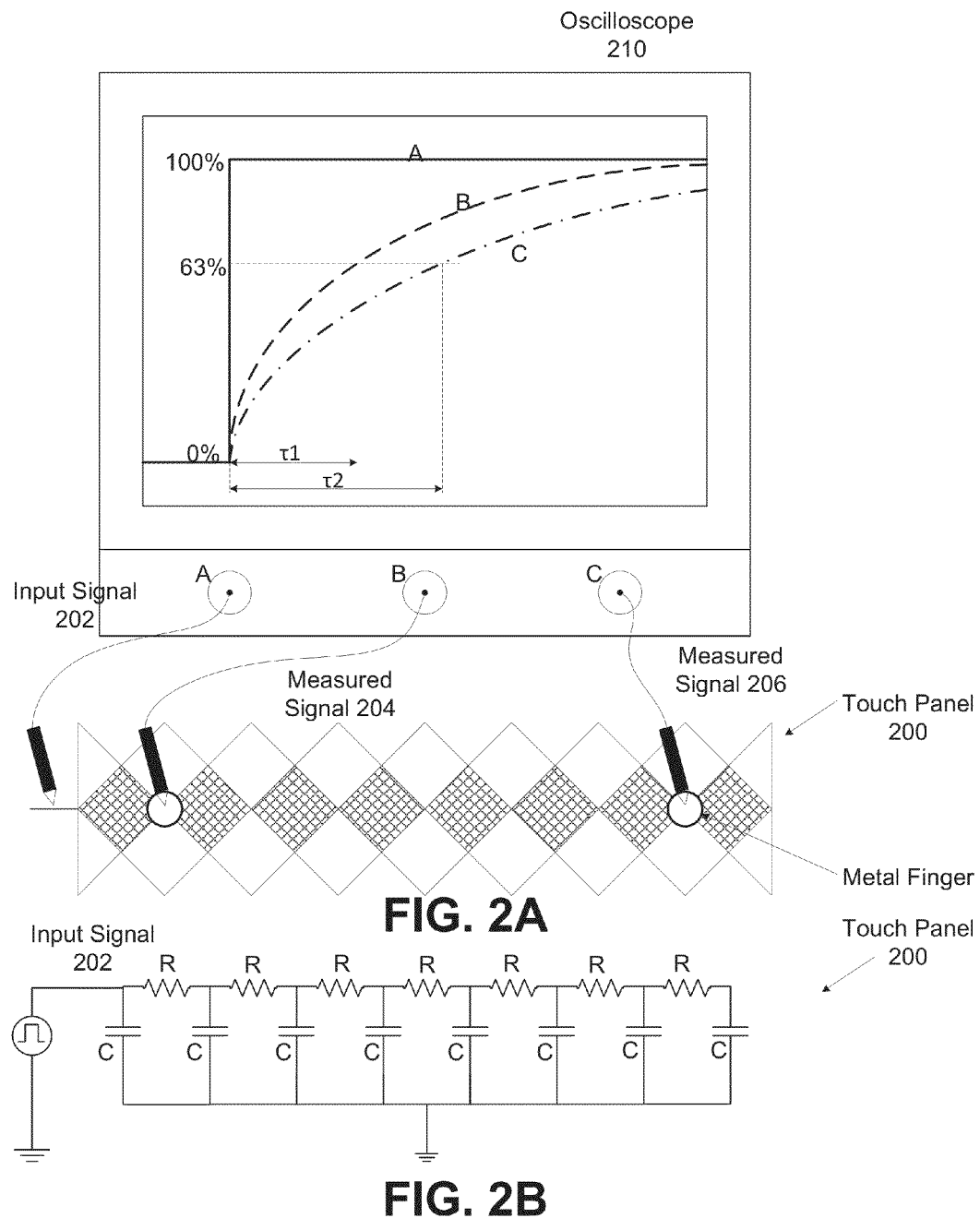
FIG. 2A illustrates manually measuring a time constant of a touch panel using an oscilloscope according to one implementation.
FIG. 2B illustrates a schematic line representation of the sensors of the touch panel of FIG. 2A.

FIG. 2A illustrates manually measuring a time constant of a touch panel using an oscilloscope according to one implementation. In this implementation, an input step signal 202 (A) of an oscilloscope 210 is applied to one end of the touch panel 200 and two metal fingers (or other probes) are used to measure the signal, measured signals 204 (B) and 206 (C). The oscilloscope 210 shows that the measured signal 204 (B) reaches approximately 63% by a first time constant ($\tau 1$) and the measured signal 206 (C) reaches approximately 63% by a second time constant ($\tau 2$). These waveforms represent the step function response of the touch panel 200 at these different locations of the touch panel 200. For application where TX signals are applied to one direction and responses are read from other direction, a resulting time constant of a given sensor (intersection of TX electrode and RX electrode) is equal to sum of a time constant of the TX electrode time constant and a time constant of the RX electrode.

FIG. 2B illustrates a schematic line representation of the sensors of the touch panel of FIG. 2A. Each sensor from left to right adds a capacitor (C) and a resistor (R) load. As shown, the sensors (intersections between TX and RX electrodes) that are farther away from the input signal 202 have a greater time constant due to the additional R and C of intervening sensors. These manual procedures require using additional measuring equipment and an operator and cannot be performed by the touch controller itself. These manual procedures are difficult to automate and may not be accurate.

The embodiments described herein do not utilize external measurement equipment, like an oscilloscope to determine time constants of a touch panel. The embodiments utilize a time-constant calculator of a controller (e.g., touchscreen controller) to determine the time constants of a touch panel (e.g., touchscreen panel). The operations of time-constant calculator 120 are described below with respect to FIGS. 3-9.

The time-constant calculator 120 can be used in connection with other position detection and gesture recognition units. These units may obtain a capacitive image of a capacitive sense array 125. The capacitive image includes multiple cells each with a capacitance value of an intersection of sense elements of the sense array 125. Alternatively, these units can receives the raw capacitance value measured by the capacitive-sensing circuit 101 and then compute a difference count, which is a difference between the raw capacitance value and a baseline capacitance value. Alternatively, the capacitance-sensing circuit 101 outputs the difference count to the time-constant calculator 120. The time-constant calculator 120 can process the capacitive data received from the capacitance-sensing circuit 101 to determine the time constant as described herein.

In one embodiment, the time-constant calculator 120 is implemented in firmware of the processing device 110. In another embodiment, the time-constant calculator 120 is implemented in software, hardware, or any combination thereof. In another embodiment, the time-constant calculator 120 is implemented as part of a gesture recognition tool that calculates and reports gestures. In another embodiment, the time-constant calculator 120 can be implemented on the host, and the capacitive-sensing circuit 101 obtains the touch data and sends the touch data to the time-constant calculator 120 on the host processor 150. Alternatively, other configurations are possible as would be appreciated by one of ordinary skill in the art having the benefit of this disclosure. It should also be noted that the touches can be reported to various applications executing on the host processor 150.

Figure 3:
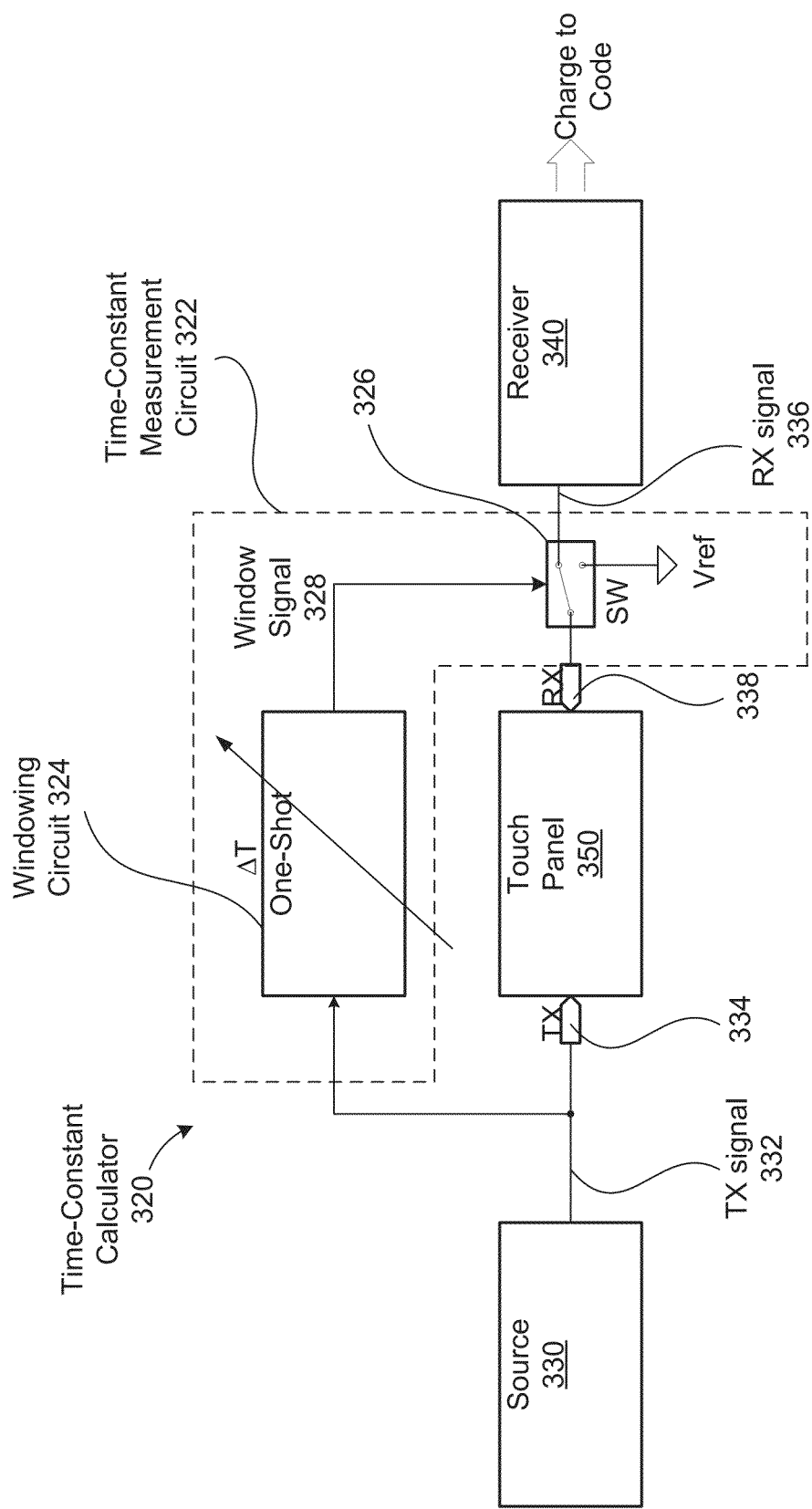
FIG. 3 is a block diagram of a time-constant calculator according to one embodiment.

FIG. 3 is a block diagram of a time-constant calculator 320 according to one embodiment. The time-constant calculator 320 may include hardware, firmware, software, or any combination thereof. In this embodiment, the time-constant calculator 320 includes a time-constant measurement circuit 322 that can interact with circuitry of the capacitance-sensing circuit 101 as described above. For example, the capacitance-sensing circuit 101 includes a source circuit 330 and a receiver 340. During normal operation, the source signal 330 generates a TX signal 332 and drives a TX electrode 334 (e.g., TX terminal) of a touch panel 350. The receiver 340 measures a RX signal 336 on a RX electrode 338 (RX terminal) of the touch panel 350. The receiver 340 measures the signal, for example, using an active integrator, and outputs the measured signal to a converter for charge-to-code conversion.

During a time-constant measuring mode, the time-constant measurement circuit 322 can receive the TX signal 332 from the source 330 and can control timing of when the RX signal 336 is input into the receiver 340 as described in more detail below.

The operation principle is based on measurement of charge received by receiver 340 as a function of time interval (window) during which charge receiving is performed.

In this embodiment, the time-constant measurement circuit 322 includes a windowing circuit 324 and a switch 326. The windowing circuit 324 receives the TX signal 332 and generates a window signal 328 to control the switch 322 that selectively couples the RX electrode 338 to an input of the receiver 340. The windowing circuit 324 may be a one-shot element that can be set to have different time periods ($\Delta T$) to create windows with different time periods on the window signal 328. The one-shot element generates pulses of programmable width for the window signal 328 that is synchronized with edges of the TX signal 332. The window signal 328 controls the state of the switch 326. The switch 326, which is controlled by the window signal 328, controls the amount of charge transferred from the RX terminal 338 to a sensing channel of the receiver 340. For example, when the window signal 328 is in high state, the RX terminal 338 is connected to sensing channel and when the window signal 328 is in low state, the RX terminal 338 is connected to a reference voltage (Vref) equal to the potential of receiver 340 input. This provides a path to ground for incoming current and provides a fixed potential on the RX terminal 338.

Figure 4:
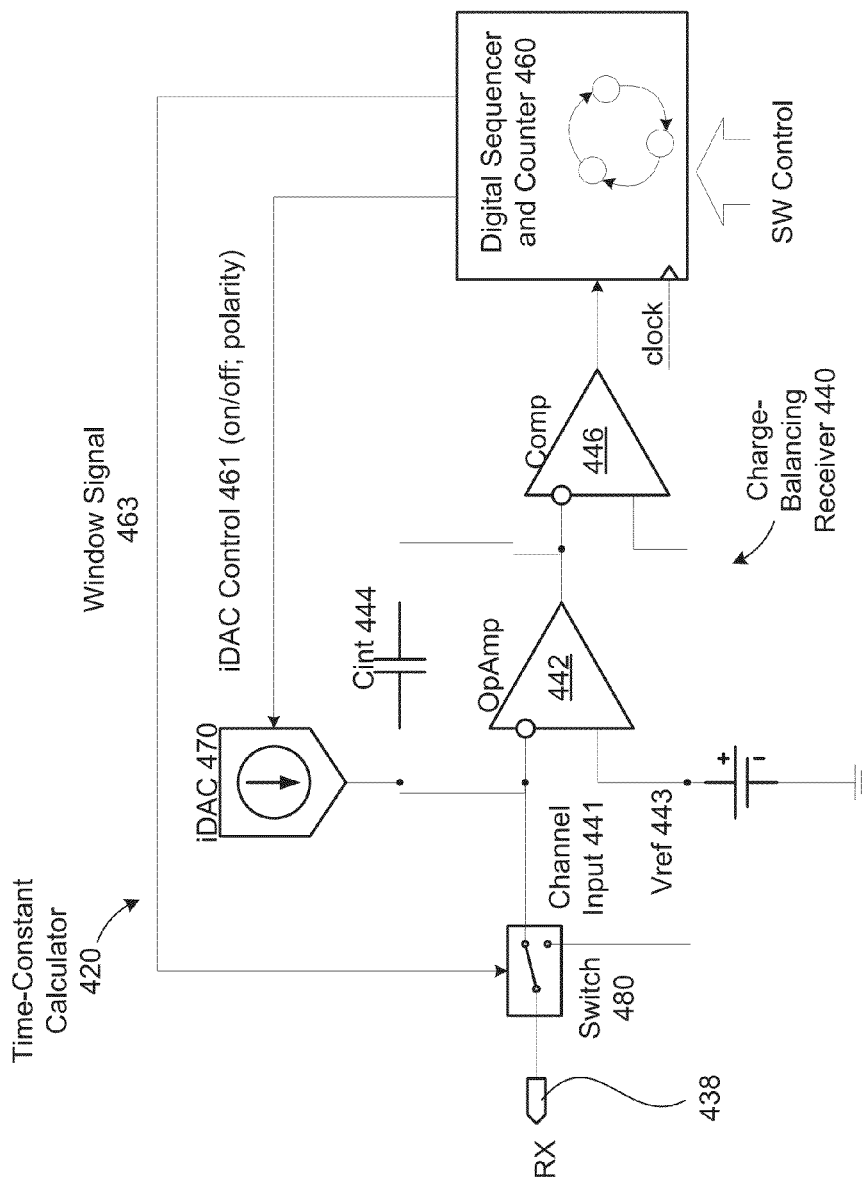
FIG. 4 is a block diagram of a time-constant calculator according to another embodiment.

FIG. 4 is a block diagram of a time-constant calculator 420 according to another embodiment. The time-constant calculator 420 is used in connection with a charge-balancing receiver 440. The charge-balancing receiver 440 includes an active integrator, including an operational amplifier 442 and an integrator capacitor 444, a comparator 446, a programmable current source 470 (iDAC), and a digital sequencer and counter 460. The time-constant calculator 420 may include hardware, firmware, software, or any combination thereof. In this embodiment, the time-constant calculator 420 utilizes the digital sequencer and counter 460 to control a switch 480 at an input of the charge-balancing receiver 440. In one embodiment, the digital sequencer includes windowing logic to generate a window signal 463 to control the switch 480 at the input of the charge-balancing receiver 440. The digital sequencer and counter 460 can receive control parameters or control instructions from software operating on the processing device (labeled as SW control) to configure the digital sequencer and counter 460 to operate in a normal mode or in a time-constant measuring mode.

During normal operation, the RX signal is received at a channel input 441 of the charge-balancing receiver 440 from an RX terminal 438. The input signal is integrated by the operational amplifier 442 and integrator capacitor 444 and input into the comparator 446. The output of the comparator is clocked into the digital sequencer and counter 460. The counter can be used to convert the measured signal into counts. The digital sequencer can be used to control TX signal generation, as well as to control the programmable current source 470 using a control signal 461. The control signal 461 may be one or more signals that control a value of the programmable current source, as well as direction of the programmable current source 470. The programmable current source 470 is used to balance the current input into the operational amplifier 442.

During a time-constant measuring mode, the digital sequencer and counter 460 can control the switch 480 via a window signal 463 to control timing of when the RX signal on the RX terminal 438 is input into the charge-balancing receiver 440. For example, windowing logic in the digital sequencer synchronizes the window signal 463 to the TX signal applied to a TX electrode of the touch panel. The window signal 463 controls the switch 480 that selectively couples the RX electrode 438 to an input of the operational amplifier 442. The digital sequencer and counter 460 can the window signal 463 with different time periods (ΔT) to create windows with different time periods of when the RX signal is input into the charge-balancing receiver 440. The window signal 463 can be synchronized with edges of the TX signal. The window signal 463 controls the state of the switch 480. The switch 480, which is controlled by the window signal 463, controls the amount of charge transferred from the RX terminal 438 to the sensing channel 441 of the charge-balancing receiver 440. For example, when the window signal 463 is in high state, the RX terminal 438 is connected to sensing channel 441 and when the window signal 463 is in low state, the RX terminal 438 is connected to a reference voltage (Vref) 443 equal to the potential of the sensing channel input 441. This provides a path to ground for incoming current and provides a fixed potential on the RX terminal 438. The reference voltage 443 may be the same reference voltage used for the operational amplifier 442 and the comparator 446 of the charge-balancing receiver 440.

The digital sequencer and counter 460 can output a digital value (count) that represents the signal measured by the charge-balancing receiver 440 on RX terminal 438. The integrated charge is proportional to the capacitance of the sensor. It should be noted that the integration with windowing technique described herein can be used with charge-balancing sensing channels as shown in FIG. 4, as well as with other types of charge-transfer circuits. The window integration technique is further described below with respect to the voltage and current waveforms shown in FIG. 5A-5B.

Figure 5A:
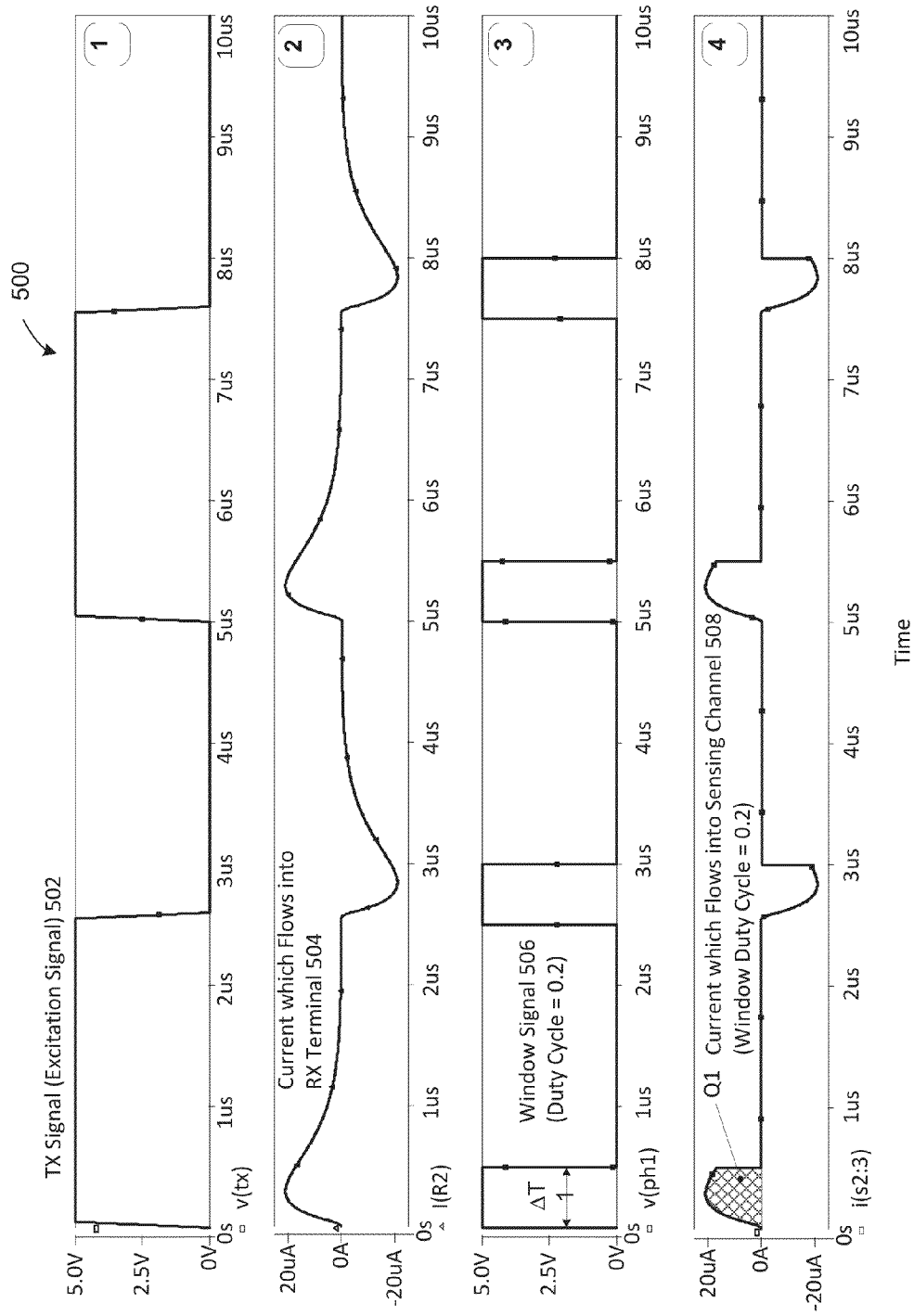
FIG. 5A is a graph illustrating waveforms of the time-constant calculator according to an embodiment.
Figure 5B:
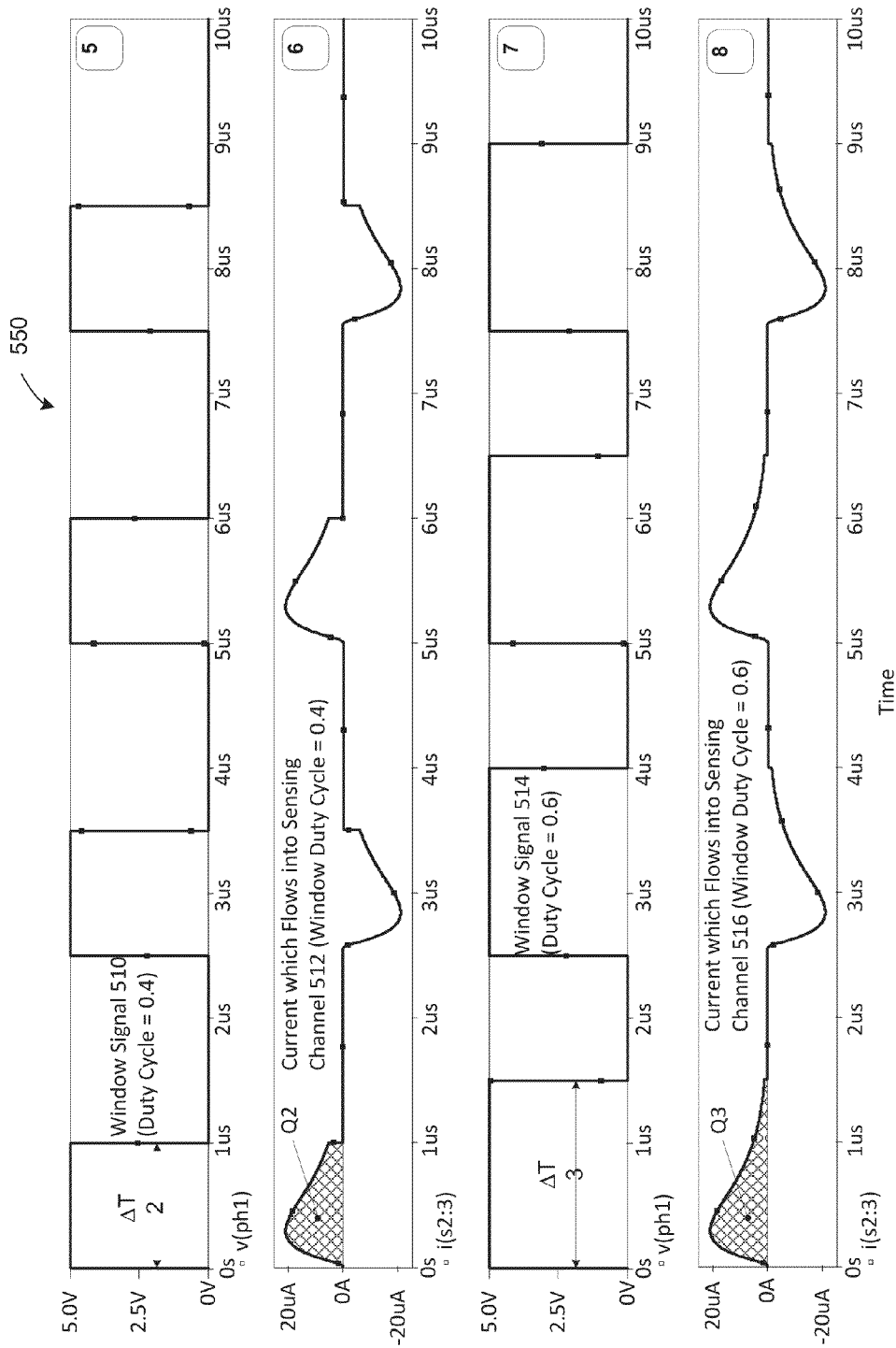
FIG. 5B is a graph illustrating waveforms of the time-constant calculator according to an embodiment.

FIG. 5A is a graph 500 illustrating waveforms of the time-constant calculator according to an embodiment. FIG. 5B is a graph 550 illustrating of the time-constant calculator according to an embodiment. The waveform 502 (waveform 1) represents an excitation signal (also referred to as TX signal voltage). The waveform 504 (waveform 2) represents current that flows into RX terminal. Waveforms 506 (waveform 3 in FIG. 5A), 510 and 514 (waveforms 5 and 7 in FIG. 5B) represent different window signals with pulse width ΔT1, ΔT2, ΔT3, respectively. The pulse widths represent different durations of the window signal where ΔT1<ΔT2<ΔT3. Waveforms 508 (waveform 4 in FIG. 5A), 512 and 516 (waveforms 6 and 8 in FIG. 5B) represent current which flows into the sensing channel for the different window signals. That is waveform 508 corresponds to ΔT1, waveform 512 corresponds to ΔT2 and waveform 516 corresponds to ΔT3.

It can be seen that amount of charge transferred into sensing channel (Q1<Q2<Q3) varies with window pulse width (ΔT1<ΔT2<ΔT3). There is dependence between a charge measured and the window duration. The dependence is exponential. The time constant for the RX terminal can be calculated from the measured change with the varied window durations.

Figure 6:
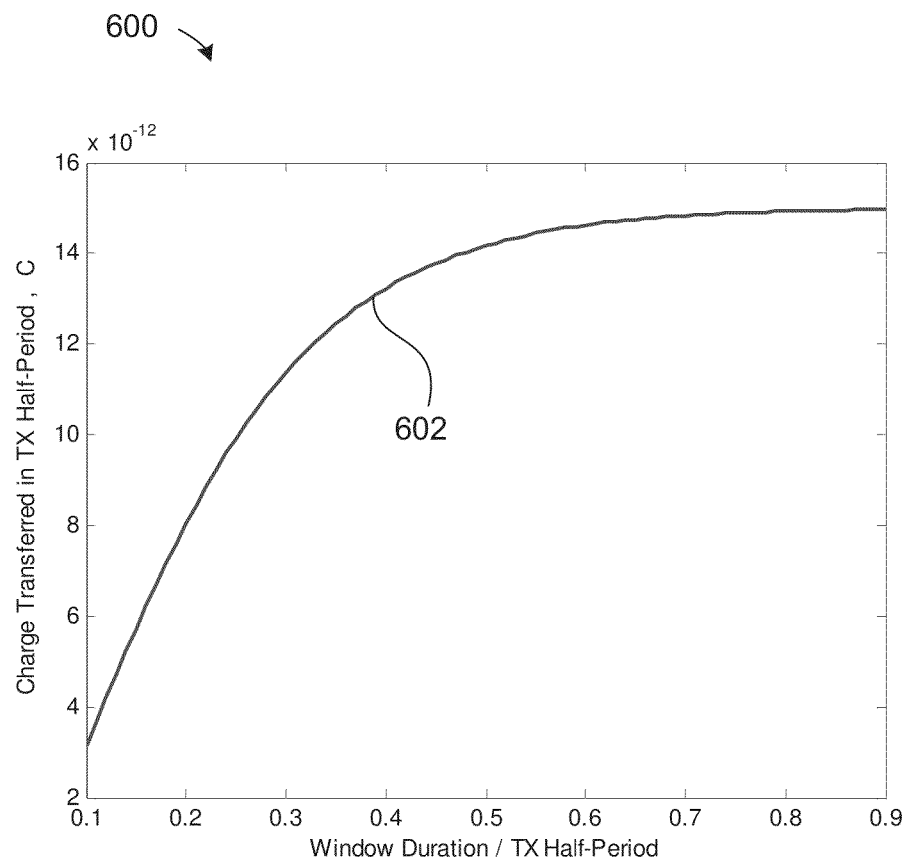
FIG. 6 is a graph illustrating a charge transferred into a sensing channel in one TX half-period versus window pulse width according to one embodiment.

FIG. 6 is a graph 600 illustrating a charge transferred into a sensing channel in one TX half-period versus window pulse width according to one embodiment. Graph 600 illustrates a dependence 602 of the charge transferred into sensing channel in one TX half-period versus window pulse width, Q=F (ΔT). This dependence is exponential and is defined by time constant (τ) which represents RC properties of touch panel as in the following equation (1):

$$\tau = R \times C \tag{1}$$

For all-points-addressable (APA) sensing, the following equation can be used for the time constant:

$$\tau \approx \tau_{RX} + \tau TX \tag{2}$$

In a further embodiment, raw counts obtained by touch controller are proportional to transferred charge. The touch controller can tabulate raw counts for different window pulse durations. Time constant can be determined from this data.

Figure 7:
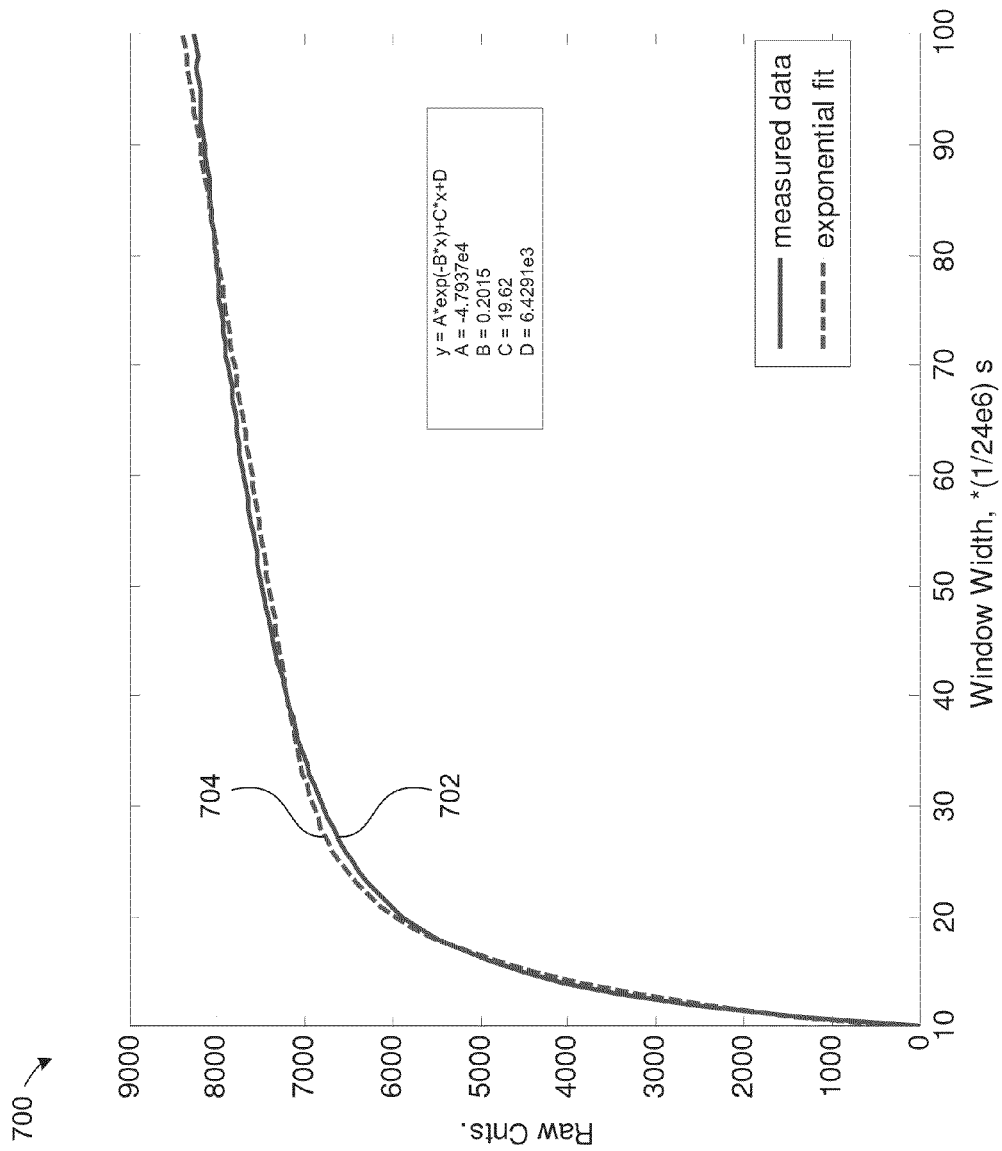
FIG. 7 is a graph illustrating typical digital values versus window pulse width dependence and an exponential fit of the same according to an embodiment.

FIG. 7 is a graph 700 illustrating typical digital values versus window pulse width dependence and an exponential fit of the same according to an embodiment. Line 702 represents a typical dependence of raw counts (digital values) versus the window pulse width. Regression analysis can be applied to determine the time constant. For example, the measured data can be approximated by least square approximation with an exponential curve as in the following equation.

$$y(x) = Ae^{-Bx} + C, \tag{3}$$

where y is the raw counts, x is the window pulse width, and A, B and C are approximation coefficients. The time constant is equal to the inverse of coefficient B as in the following equation:

$$\tau = \frac{1}{B}$$

(4)

In this example, it is assumed that sensing channel is ideal and the raw counts are proportional to charge transferred to its input. In other cases non-ideal channel behavior can be taken into account to obtain better regression, and thus, more accurate time constant values. For instance, assume that current leakage is present in the channel (constant current source on channel input). In this case measured data is approximated with following curve:

$$y(x) = Ae^{-Bx} + Cx + D. \tag{5}$$

The linear coefficient C is proportional to leakage current. Also the presence of leakage term can be physically explained as charge diffusion over distributed panel. Line 704 represents an exponential fit of measured data using equation (5). Alternatively, other approximation techniques or optimization techniques may be used to calculate the time constant from the measured data 702.

Figure 8:
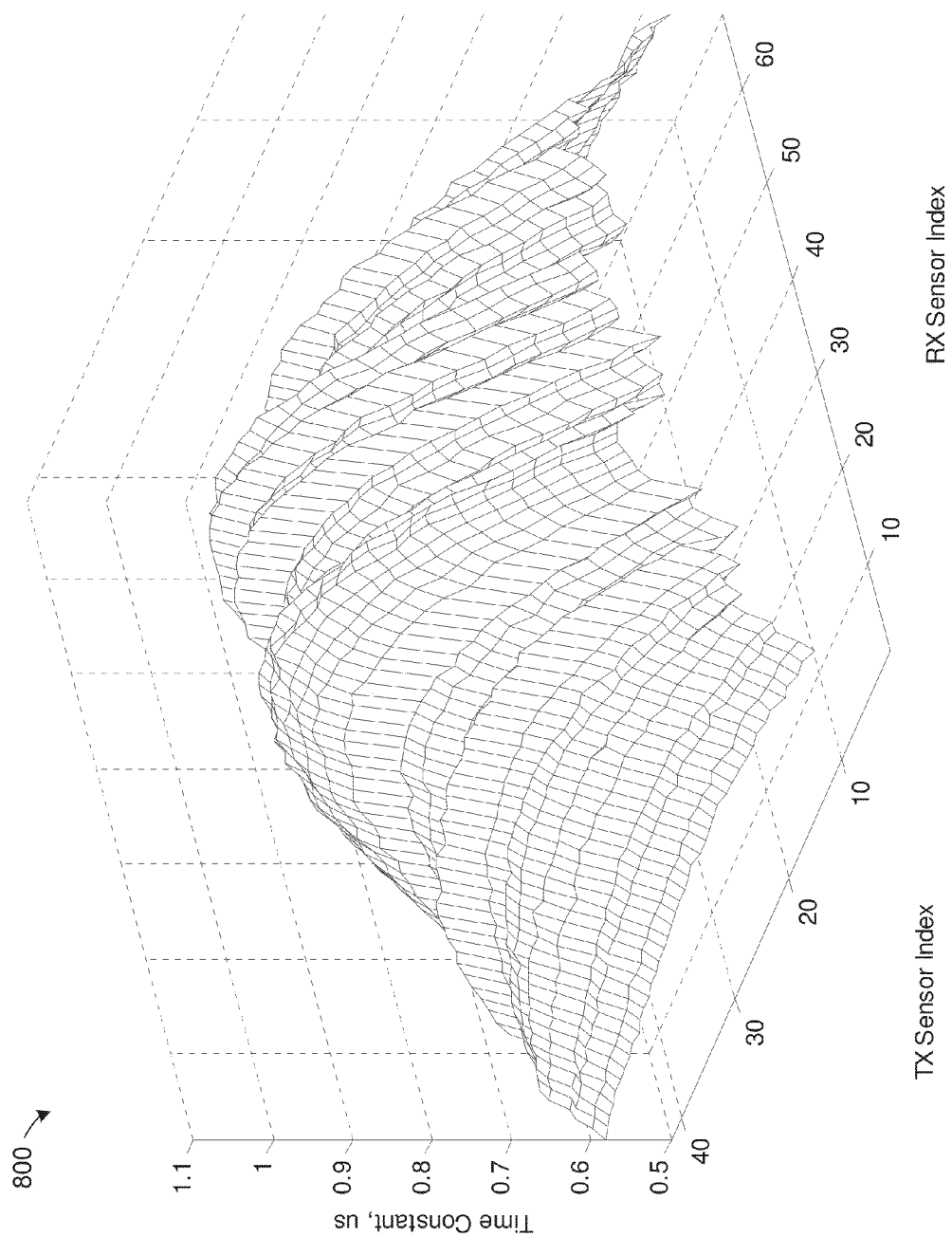
FIG. 8 is a graph illustrating time constants of intersections of an ITO panel according to one embodiment.
Figure 9:
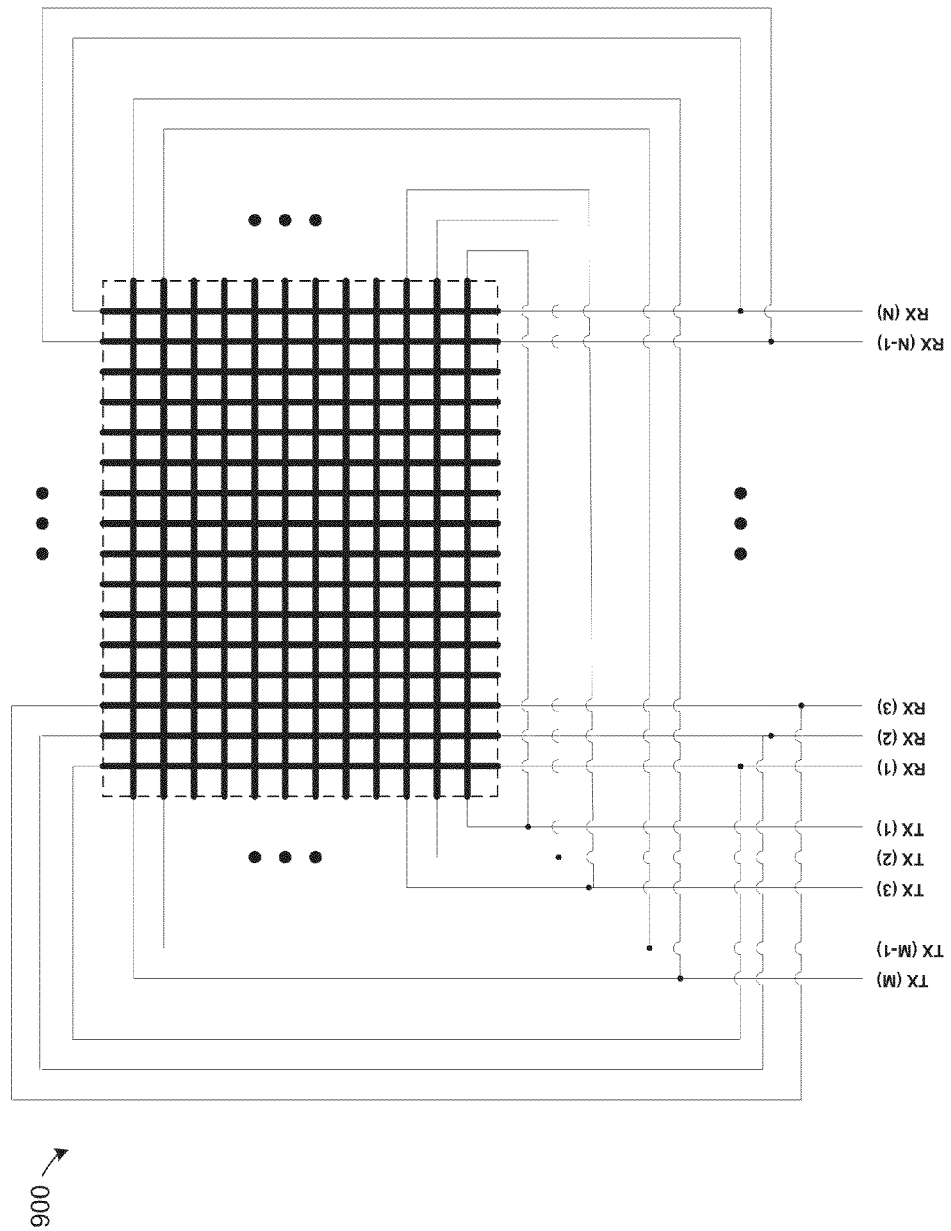
FIG. 9 illustrates a double routed sensing panel according to one embodiment.

FIG. 8 is a graph 800 illustrating time constants of intersections of an ITO panel according to one embodiment. The ITO panel has multiple TX-RX intersections and the graph illustrates the time constants determined for those intersections. In this embodiment, the ITO panel is a 42×68 both TX and RX double-routed sensing panel 900 (ITO panel), as illustrated in FIG. 9. The time constant values for the ITO panel are 1/B as measured and approximated as described above.

Figure 10:
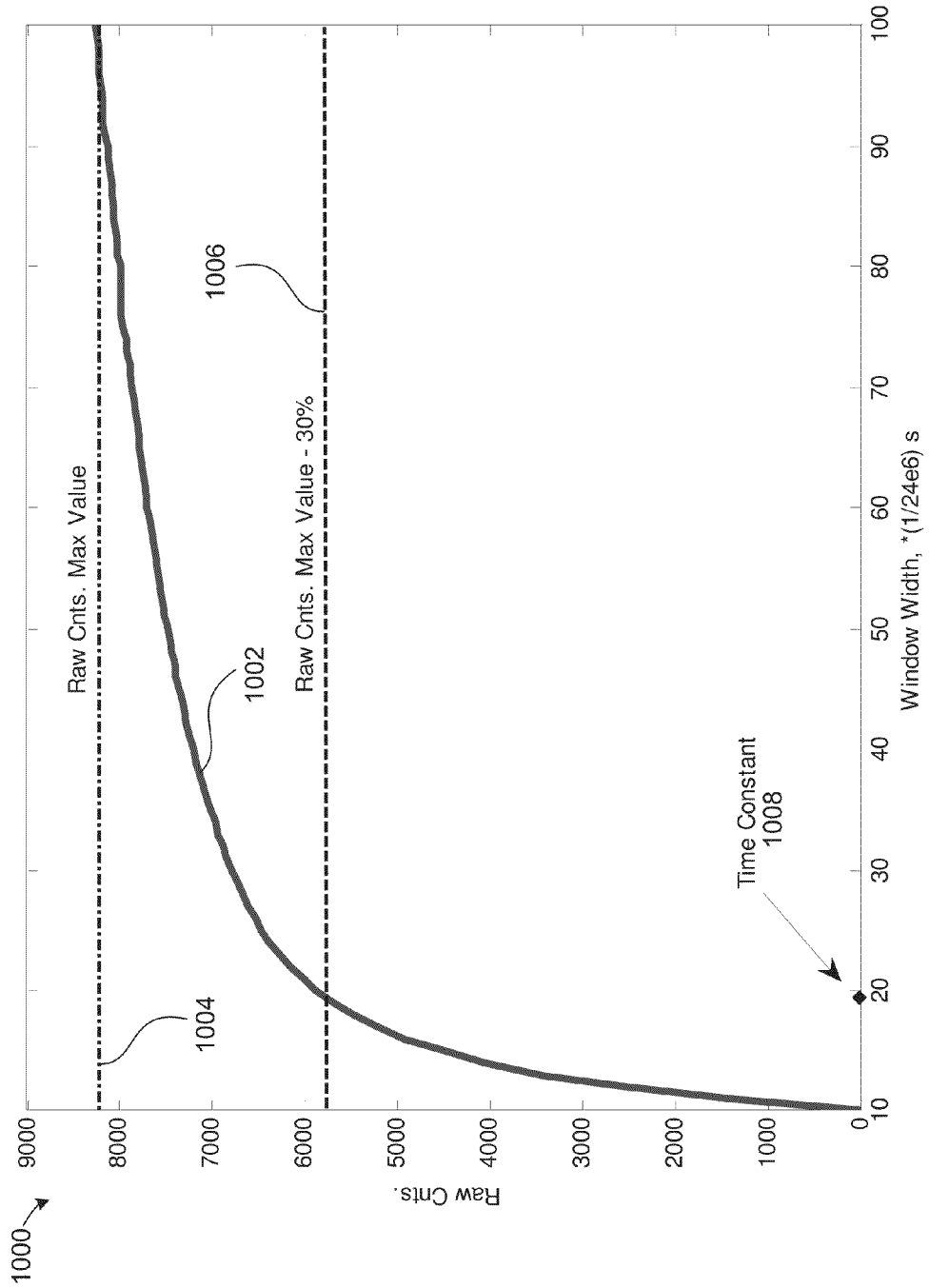
FIG. 10 is a graph illustrating an approximate determination of a time constant according to one embodiment.

FIG. 10 is a graph 1000 illustrating an approximate determination of a time constant according to one embodiment. Graph 1000 includes measured data 1002 as measured by the capacitance-sensing circuit. The time-constant calculator determines a raw count maximum value 1004 and a threshold value 1006 that is a percentage less than the maximum value 1004, such as 30% less or the like. The threshold value 1006 represents the raw counts percentage change. In this given example, the threshold value 1006 is 30%, but can be other percentages since this value can be programmable. The time-constant calculator determines a time constant 1008 for the touch panel (or a single intersection) using the window width and the raw counts for the corresponding measured data. The threshold value 1006 can be configured at both compile and run-time.

Figure 11:
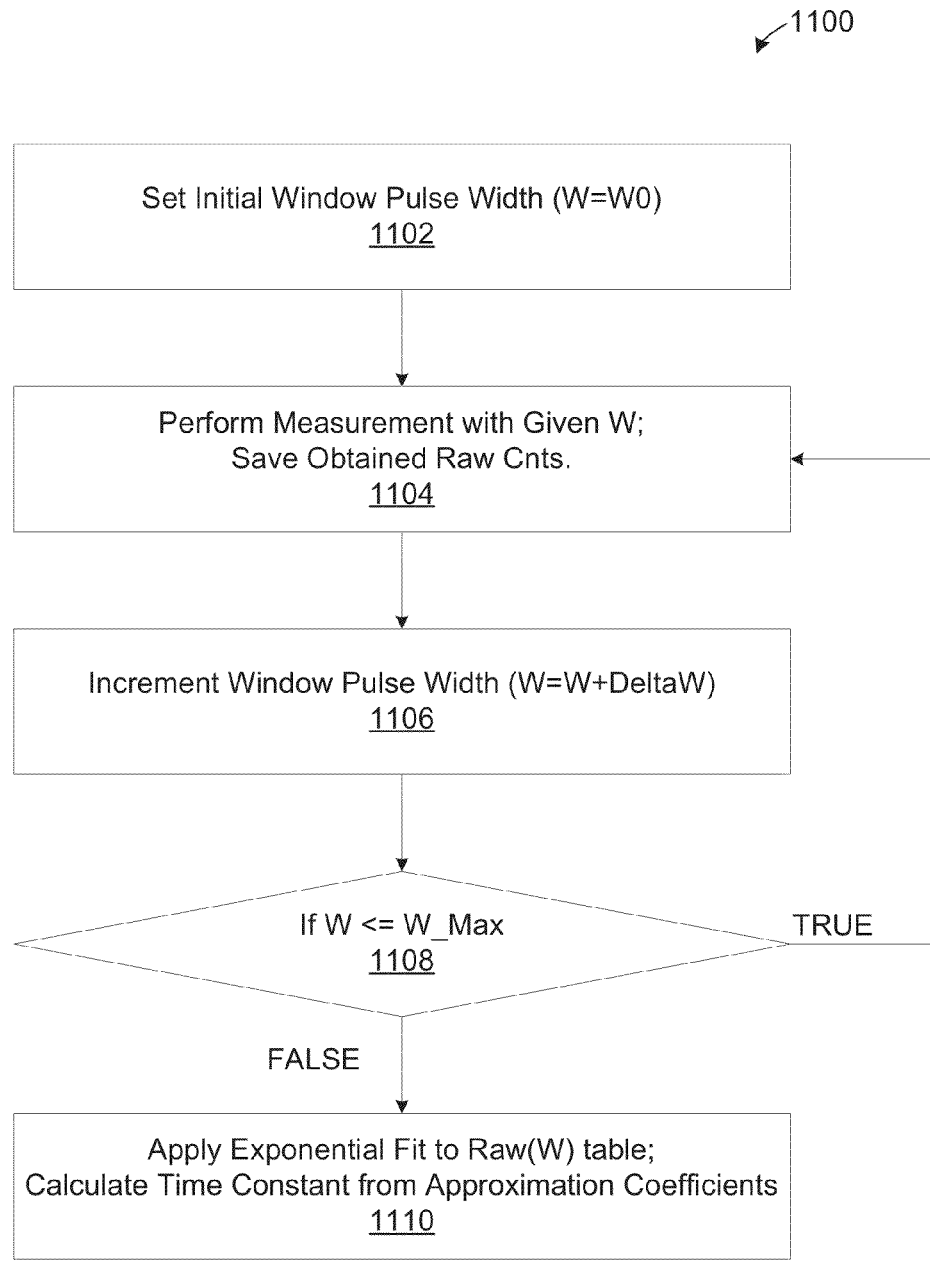
FIG. 11 is a flow diagram of a method of time-constant calculation according to one embodiment.

FIG. 11 is a flow diagram 1100 of a method of time-constant calculation according to one embodiment. The method 1100 may be performed by processing logic that may comprise hardware (circuitry, dedicated logic, etc.), software (such as is run on a general purpose computing system or a dedicated machine), firmware (embedded software), or any combination thereof. In one embodiment, the processing device 110 performs the method 1100. In another embodiment, the time-constant calculator 120 performs the method 1100. Alternatively, other components of the electronic system 100 perform some or all of the operations of method 1100.

Referring to FIG. 11, the method 1100 begins with processing logic setting an initial window pulse width (W=W0) (block 1102). The initial window pulse width can be equal to a half TX period (T/2). The processing logic performs measurement with given window pulse width (W) and saves the raw counts as Raw(W) (Block 1104). The processing logic increments the window pulse width (W=W+DeltaW) (block 1106). The processing logic determines if the current window pulse width is less than or equal to the maximum window pulse width (W_Max) (block 1108). If so, the processing logic returns to perform the measurements with the given window pulse width at block 1104. Once the maximum window pulse width (W_Max) is exceeded, the processing logic applies an exponential fit to the raw counts (Raw(W)) table and calculates a time constant from approximation coefficients (block 11010) and the method 1100 ends.

Figure 12:
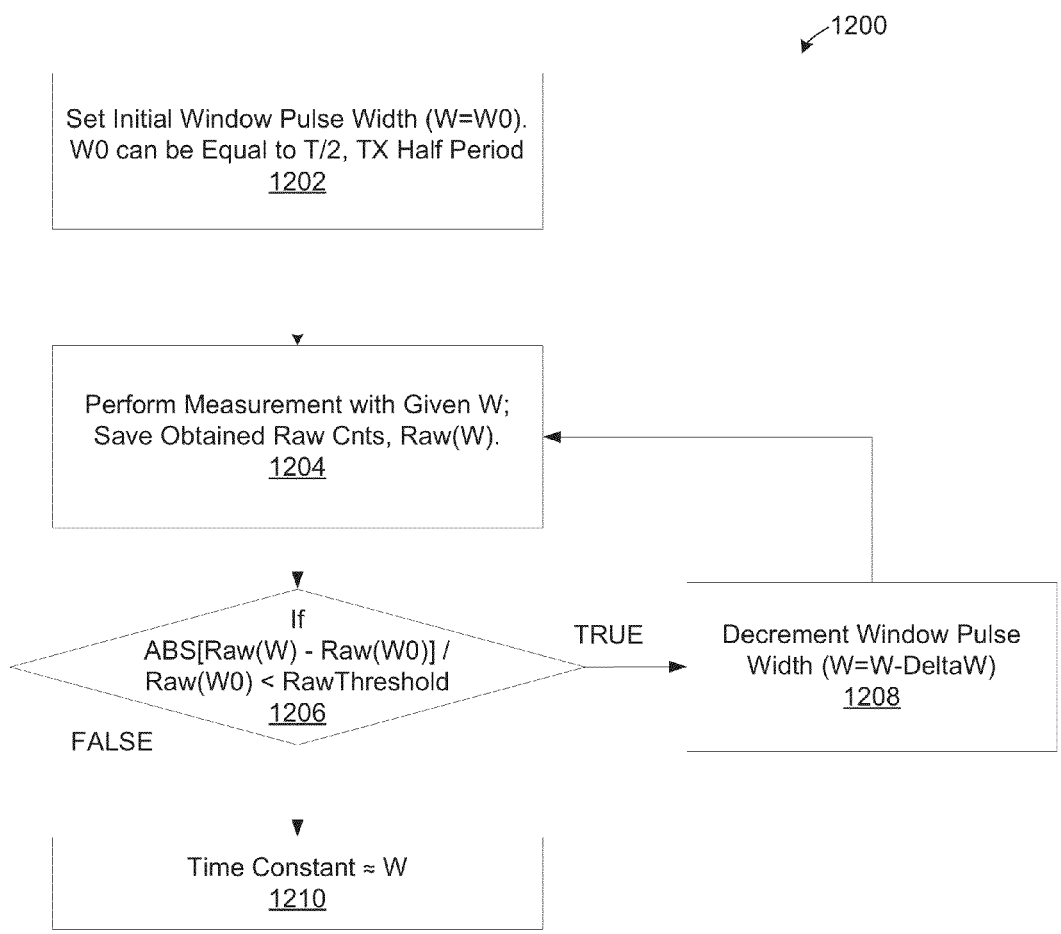
FIG. 12 is a flow diagram of a method of time-constant calculation according to another embodiment.

FIG. 12 is a flow diagram of a method 1200 of time-constant calculation according to another embodiment. The method 1200 may be performed by processing logic that may comprise hardware (circuitry, dedicated logic, etc.), software (such as is run on a general purpose computing system or a dedicated machine), firmware (embedded software), or any combination thereof. In one embodiment, the processing device 110 performs the method 1200. In another embodiment, the time-constant calculator 120 performs the method 1200. Alternatively, other components of the electronic system 100 perform some or all of the operations of method 1200.

Referring to FIG. 12, the method 1200 begins with processing logic setting an initial window pulse width (W=W0) (block 1202). The initial window pulse width can be equal to a half TX period (T/2). The processing logic performs measurement with given window pulse width (W) and saves the raw counts as Raw(W) (Block 1204). The processing logic determines if the absolute value of a difference between a current raw data Raw(W), which is the data measured with current window pulse width W) and the initial raw data Raw (W0), which is the data measured with the initial window pulse width W0, divided by the initial raw data Raw(W0) does not exceed a threshold value (RawThreshold) (block 1206) (e.g., is less than the threshold value). If less than, the processing logic decrements the window pulse width (W=W−DeltaW) (block 1208) and returns to block 1204. If at block 1206, the calculated value exceeds the threshold value (Raw Threshold) (e.g., equal to or greater than the raw threshold), the processing logic determines a time constant using the measured data with the current window pulse width (W), and the method 1200 ends.

In one embodiment at blocks 1104 of FIGS. 11 and 1204 of FIG. 12, the processing logic collects a capacitive image of measured values. The capacitive image may include multiple cell values representing the capacitances of the intersections of a capacitive sense array. In one embodiment, the processing logic calculates the difference counts, which are the differences between the raw counts of the intersections and the baselines of the intersections. In another embodiment, the processing logic receives the difference counts from a different circuit or routine executing on the processing device.

In a further embodiment, the sense array is a capacitive sense array, and each of the multiple cells includes a capacitance value of an intersection of sense elements in the capacitive sense array. In another embodiment, the sense array is an optical sense array, and the cell values represent the values measured by an optical sensing device. Alternatively, the time-constant calculation embodiments described herein may be used in other sensing systems, such as, for example, a system that creates a digitized heat map using reflected light.

The methods described above regarding time-constant calculation can be implemented by the time-constant calculator 120, which may be implemented in a capacitive touch screen controller. In one embodiment, the capacitive touch screen controller is one of the TrueTouch® capacitive touchscreen controllers, such as the CY8CTMA3xx family of TrueTouch® Multi-Touch All-Points touchscreen controllers, developed by Cypress Semiconductor Corporation of San Jose, Calif. The TrueTouch® capacitive touchscreen controller sensing technology to resolve touch locations of multiple fingers and a stylus on the touch-screens, supports leading operating systems, and is optimized for low-power multi-touch gesture and all-point touchscreen functionality. Alternatively, the touch position calculation features and time-constant calculation features may be implemented in other touchscreen controllers, or other touch controllers of touch-sensing devices. In one embodiment, the touch position calculation features and time-constant calculation features may be implemented with other touch filtering algorithms as would be appreciated by one of ordinary skill in the art having the benefit of this disclosure.

The embodiments described herein may be used in various designs of mutual-capacitance sensing arrays of the capacitance sensing system, or in self-capacitance sensing arrays. In one embodiment, the capacitance sensing system detects multiple sense elements that are activated in the array, and can analyze a signal pattern on the neighboring sense elements to separate noise from actual signal. The embodiments described herein are not tied to a particular capacitive sensing solution and can be used as well with other sensing solutions, including optical sensing solutions, as would be appreciated by one of ordinary skill in the art having the benefit of this disclosure.

Figure 13A:
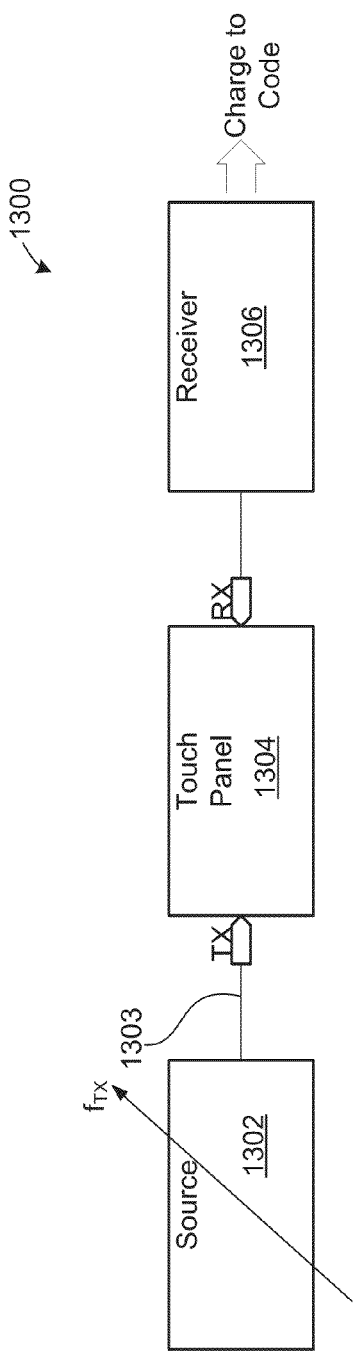
FIG. 13A is a block diagram of a time-constant calculator according to another embodiment.

FIG. 13A is a block diagram of a time-constant calculator 1300 according to another embodiment. The time-constant calculator 1300 can configure a programmable frequency source 1302 to generate a pulse signal 1303 (e.g., rectangular pulse or a harmonic signal. The amount of charge transferred through RX terminal varies with the change of source frequency, Q=F(fTX) for the touch panel 1304. Since raw counts are proportional to transferred charge, similar approaches as those described herein can be used to determine panel time constant. The charge can be measured at a receiver 1306 of a touch controller and converted to counts by a converter (not illustrated) (or other charge to code conversion). For this approach, the touch controller tabulates raw counts for different TX frequencies. Then time constant can be extracted from coefficients returned from regression analysis. Using the programmable frequency source 1302, the time-constant calculator does not use an analog switch on the receiver input as described above. Another way to get time constant is to measure a transfer function of the touch panel 304 using a network analyzer. Using the time-constant calculator 1300, the time constant can be determined from measured cutoff frequency of the touch panel 1304 instead of using a network analyzer.

Figure 13B:
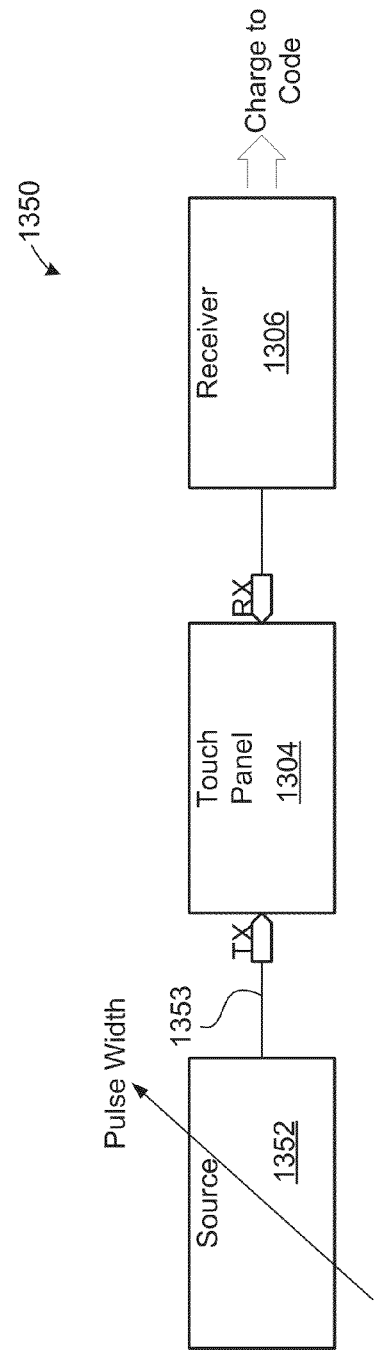
FIG. 13B is a block diagram of a time-constant calculator according to another embodiment.

FIG. 13B is a block diagram of a time-constant calculator 1350 according to another embodiment. The time-constant calculator 1350 can configure a programmable pulse width source 1352 to generate a pulse signal 1303 of fixed frequency and programmable width (e.g., rectangular pulse or a harmonic signal). The amount of charge transferred through RX terminal varies with the change of pulse widths of the signal applied to the touch panel 1304 as described above. Since raw counts are proportional to transferred charge, similar approaches as those described herein can be used to determine panel time constant. The charge can be measured at a receiver 1306 of a touch controller and converted to counts by a converter (not illustrated) (or other charge to code conversion). For this approach, the touch controller tabulates raw counts for different pulse widths. Then time constant can be extracted from coefficients returned from regression analysis. Using the programmable pulse width source 1352, the time-constant calculator does not use an analog switch on the receiver input as described above.

Embodiments of a window integration technique can be combined with other methods can be used for noise immunity improvement (to external noise) of touchscreen controllers. The embodiments described herein could be used for the dynamic systems parameters estimation or for system model extraction. Examples include the automatic control systems in temperature control, motor control, etc.

Noise immunity improvement to external noise of touchscreen controllers may be achieved with these embodiment by allowing selecting optimal operation frequency for the touch controller. Other application could be automatic panel screening at the manufacturing stage. Alternative application includes the self-test procedures or diagnostic procedures for the touch controller to catch difficult-to-discover problems.

The window integration techniques described herein, such as using an analog single-pole-double-throw switch in FIG. 3, can connect an RX pin to a sensing channel or a voltage reference to regulate the amount of charge transferred to sensing channel, allowing measuring of time constant of any sensor (mutual capacitance sensor (intersection of TX-RX electrodes) or self-capacitance sensor in which the capacitance of a sense element) by a touch controller at run time. As described herein, these embodiments does not require utilization of external measurement equipment and signals capturing from panel surface but only touch controller sensing channel and standard data processing tools are used to calculate the time constant(s) of the touch panel.

Embodiments of run-time measuring of time constant(s) may allow a touch controller to select an optimal set of scanning frequencies for panels' RC properties of which are either not known or have large variation from unit to unit due to manufacturing reasons. Also, the embodiments described herein may allow a touch controller to adjust working frequency on environmental conditions change, e.g. temperature.

Figure 14:
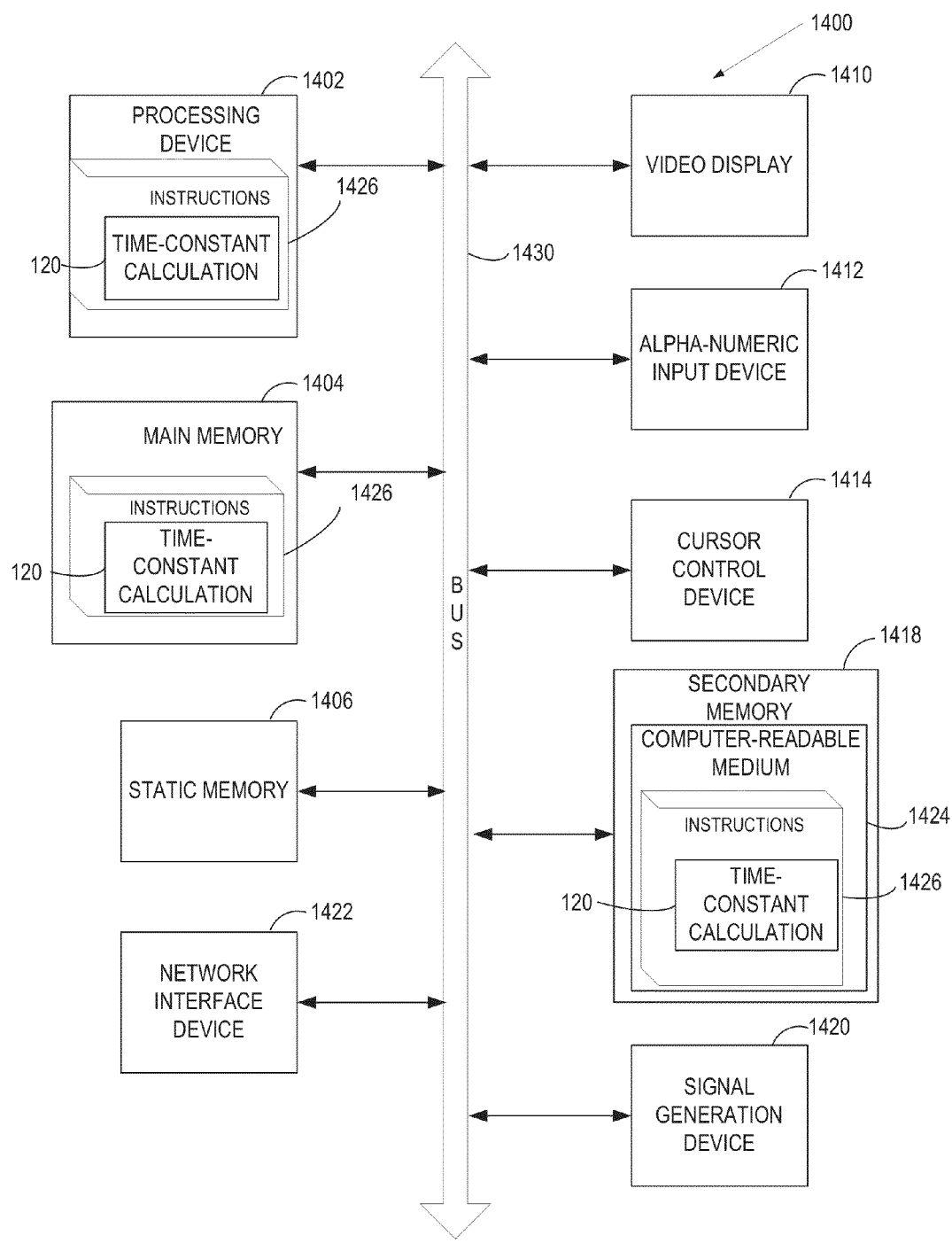
FIG. 14 is a diagram of one embodiment of a computer system for time-constant calculation.

FIG. 14 is a diagram of one embodiment of a computer system for time-constant calculation. Within the computer system 1400 is a set of instructions for causing the machine to perform any one or more of the methodologies discussed herein. In alternative embodiments, the machine may be connected (e.g., networked) to other machines in a LAN, an intranet, an extranet, or the Internet. The machine can be a host in a cloud, a cloud provider system, a cloud controller or any other machine. The machine can operate in the capacity of a server or a client machine in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1400 includes a processing device 1402 (e.g., host processor 150 or processing device 110 of FIG. 1), a main memory 1404 (e.g., read-only memory (ROM), flash memory, dynamic random access memory (DRAM) such as synchronous DRAM (SDRAM) or DRAM (RDRAM), etc.), a static memory 1406 (e.g., flash memory, static random access memory (SRAM), etc.), and a secondary memory 1418 (e.g., a data storage device in the form of a drive unit, which may include fixed or removable computer-readable storage medium), which communicate with each other via a bus 1430.

Processing device 1402 represents one or more general-purpose processing devices such as a microprocessor, central processing unit, or the like. More particularly, the processing device 1402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1402 may also be one or more special-purpose processing devices such as an application specific integrated circuit (ASIC), a field programmable gate array (FPGA), a digital signal processor (DSP), network processor, or the like. Processing device 1402 is configured to execute the instructions 1426 for performing the operations and steps discussed herein.

The computer system 1400 may further include a network interface device 1422. The computer system 1400 also may include a video display unit 1410 (e.g., a liquid crystal display (LCD) or a cathode ray tube (CRT)) connected to the computer system through a graphics port and graphics chipset, an alphanumeric input device 1412 (e.g., a keyboard), a cursor control device 1414 (e.g., a mouse), and a signal generation device 1420 (e.g., a speaker).

The secondary memory 1418 may include a machine-readable storage medium (or more specifically a computer-readable storage medium) 1424 on which is stored one or more sets of instructions 1426 embodying any one or more of the methodologies or functions described herein. In one embodiment, the instructions 1426 include instructions for the time-constant calculator 120. The instructions 1426 may also reside, completely or at least partially, within the main memory 1404 and/or within the processing device 1402 during execution thereof by the computer system 1400, the main memory 1404 and the processing device 1402 also constituting machine-readable storage media.

The computer-readable storage medium 1424 may also be used to store the instructions 1426 persistently. While the computer-readable storage medium 1424 is shown in an exemplary embodiment to be a single medium, the term "computer-readable storage medium" should be taken to include a single medium or multiple media (e.g., a centralized or distributed database, and/or associated caches and servers)

that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The instructions 1426, components and other features described herein can be implemented as discrete hardware components or integrated in the functionality of hardware components such as ASICS, FPGAs, DSPs or similar devices. In addition, the instructions 1426 can be implemented as firmware or functional circuitry within hardware devices. Further, the instructions 1426 can be implemented in any combination of hardware devices and software components.

Figure 15:
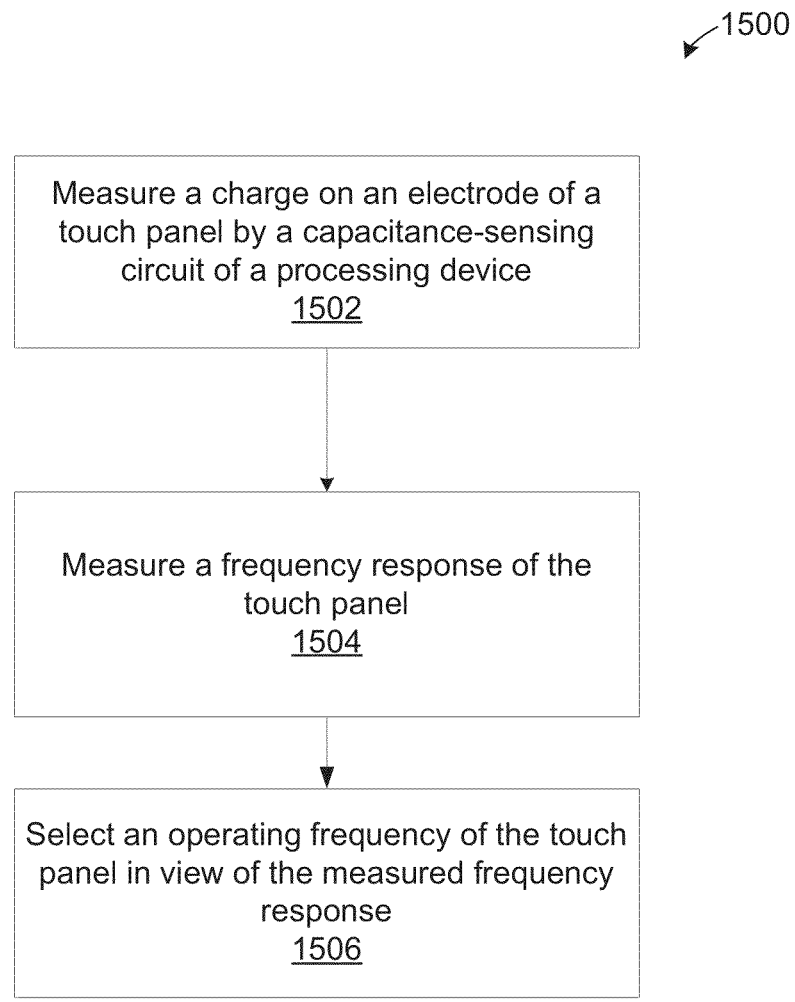
FIG. 15 is a flow diagram of a method of frequency-response calculation according to another embodiment.

FIG. 15 is a flow diagram of a method of frequency-response calculation according to another embodiment. The method 1500 may be performed by processing logic that may comprise hardware (circuitry, dedicated logic, etc.), software (such as is run on a general purpose computing system or a dedicated machine), firmware (embedded software), or any combination thereof. In one embodiment, the processing device 110 performs the method 1500. In another embodiment, the frequency-response calculator 120 performs the method 1500. Alternatively, other components of the electronic system 100 perform some or all of the operations of method 1500.

Referring to FIG. 15, the method 1500 begins with processing logic measuring a charge on an electrode of a touch panel by a capacitance-sensing circuit of a processing device (block 1502). The processing logic measures a frequency response of the touch panel (block 1504). The processing logic selects an operating frequency of the touch panel in view of the measured frequency response (block 1506).

In a further embodiment, the processing logic sets a window duration in which the charge on the electrode of the touch panel is measured by the capacitance-sensing circuit of the processing device. The processing logic measures the charge in the window duration by the capacitance-sensing circuit. The processing logic varies the window duration in which the charge on the electrode of the touch panel is measured by the capacitance-sensing circuit. There is a dependence between the charge measured by the capacitance-sensing circuit and the varied window duration. The dependence may be exponential. The processing logic measures the charge in the varied window duration by the capacitance-sensing circuit, and approximates a time constant of the touch panel from the dependence in view of the measured charge in the window duration and the varied window duration. The time constant represents the frequency response of the touch panel.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypting," "decrypting," "storing," "providing," "deriving," "obtaining," "receiving," "authenticating," "deleting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. An apparatus comprising a processing device configurable to calculate a frequency response of a touch panel coupled to the processing device, wherein the processing device comprises:
    a capacitance-sensing circuit to measure signals from the touch panel; and
    a frequency-response calculator, wherein the frequency-response calculator is configured to measure a frequency response of the touch panel, wherein the processing device is configured to select an operating frequency of the touch panel in view of the measured frequency response, wherein the operating frequency is a scanning frequency used by the capacitance-sensing circuit to measure additional signals from the touch panel, wherein the frequency response calculator comprises a time-constant calculator, wherein the time-constant calculator is configured to vary window durations during which the capacitance-sensing circuit measures the signals from the touch panel, wherein there is a dependence between a charge measured by the capacitance-sensing circuit and the window durations, and wherein the time-constant calculator is further configured to calculate a time constant from analysis of the dependence between the measured charge within the varied window durations.

2. The apparatus of claim 1, wherein the capacitance-sensing circuit comprises a receiver, wherein the time-constant calculator comprises:
    a switch coupled to an input of the receiver, wherein the switch is to switch between the signals from the touch panel and a voltage reference; and
    a windowing circuit coupled to the switch, wherein the windowing circuit is to generate the window durations during which the signals from the touch panel are input into the receiver.

3. The apparatus of claim 2, wherein the windowing circuit comprises a one-shot element configured to output a window signal, having different time periods, to the switch to create the window durations during which the signals are measured, wherein the one-shot element is configured to receive a transmit (TX) signal from a TX source and to synchronize the window signal to the TX signal.

4. The apparatus of claim 2, further comprising a converter coupled to the receiver, wherein the converter is configured to convert the charge measured by the capacitance-sensing circuit to a digital value.

5. The apparatus of claim 1, wherein the capacitance-sensing circuit comprises a receiver comprising:
    an active integrator comprising an operational amplifier and a capacitor;
    a programmable current source coupled to a channel input of the active integrator;
    a comparator coupled to an output of the operational amplifier;
    a counter coupled to an output of the comparator; and
    wherein the time-constant calculator comprises:
        a switch coupled to channel input of the receiver an electrode of the touch panel, wherein the switch is to switch between the signals received from the touch panel on the electrode and a voltage reference; and
        a digital sequencer coupled to the counter, the programmable current source and the switch, wherein the digital sequencer is to generate a window signal to control the switch to vary the window durations during which the signals from the touch panel are input into the receiver.

6. The apparatus of claim 1, wherein the capacitance-sensing circuit comprises a programmable frequency source and a receiver, wherein the frequency-response calculator is to control the programmable frequency source to vary a frequency of a pulse signal to be applied to a transmit (TX) electrode of the touch panel to vary the window durations of the pulse signal, and wherein the receiver is to measure the signals from an receive electrode of the touch panel.

7. The apparatus of claim 1, wherein the capacitance-sensing circuit comprises a programmable pulse width source and a receiver, wherein the frequency-response calculator is to control the programmable pulse width source to vary the window durations of a pulse signal to be applied to a transmit (TX) electrode of the touch panel, and wherein the receiver is to measure the signals from an receive electrode of the touch panel.

8. A method comprising:
    measuring a charge on an electrode of a touch panel by a capacitance-sensing circuit of a processing device;
    measuring a frequency response of the touch panel;
    selecting an operating frequency of the touch panel in view of the measured frequency response, wherein the operating frequency is a scanning frequency used by the capacitance-sensing circuit to measure additional charge on the electrode;

setting, by the processing device, a window duration in which the charge on the electrode of the touch panel is measured by the capacitance-sensing circuit of the processing device;

measuring the charge in the window duration by the capacitance-sensing circuit;

varying, by the processing device, the window duration in which the charge on the electrode of the touch panel is measured by the capacitance-sensing circuit, wherein a dependence between the charge measured by the capacitance-sensing circuit and the varied window duration is exponential;

measuring the charge in the varied window duration by the capacitance-sensing circuit; and approximating a time constant of the touch panel from the dependence in view of the measured charge in the window duration and the varied window duration, wherein the time constant represents the frequency response of the touch panel.

9. The method of claim 8, wherein the varying the window duration comprises generating a window signal to control a switch at an input of a receiver of the capacitance-sensing circuit.

10. The method of claim 9, wherein the varying the window duration comprises:

receiving a transmit (TX) signal from a TX source; and
synchronizing the window signal to the TX signal.

11. The method of claim 8, wherein the varying the window duration comprises generating a window signal by a digital sequencer to vary the window duration during which signals from the touch panel are input into a receiver of the capacitance-sensing circuit.

12. The method of claim 8, wherein the varying the window duration comprise controlling a programmable frequency source to vary a frequency of a pulse signal to be applied to a transmit (TX) electrode of the touch panel to vary the window durations of the pulse signal.

13. The method of claim 8, wherein the varying the window comprises controlling a programmable pulse width source to vary the window duration of a pulse signal to be applied to a transmit (TX) electrode of the touch panel.

14. The method of claim 8, wherein setting the window duration comprises setting an initial window pulse width, wherein the measuring the charge in the window duration comprises performing a first measurement with the initial window pulse width, wherein the varying the window duration comprises incrementing the initial window pulse width, and wherein measuring the charge in the varied window comprises performing a second measurement with the incremented window pulse width.

15. The method of claim 14, wherein the approximating the time constant comprises:

applying an exponential fit to data from the first measurement and the second measurement; and
calculating the time constant from an approximation coefficients of the exponential fit.

16. The method of claim 8, wherein setting the window duration comprises setting an initial window pulse width, wherein the measuring the charge in the window duration comprises performing a first measurement with the initial window pulse width, wherein the varying the window duration comprises decrementing the initial window pulse width when a difference between a current measurement and the first measurement over the first measurement is does not exceed a threshold value, wherein the time constant is determined from the current measurement when the difference over the first measurement is exceeds the threshold value.

17. An apparatus comprising:

a memory; and
a processing element coupled to the memory, wherein the processing element is configurable to:
set a window duration in which charge on an electrode of a touch panel is measured by a capacitance-sensing circuit of the processing element;
measure the charge in the window duration by the capacitance-sensing circuit;
vary the window duration in which the charge on the electrode of the touch panel is measured by the capacitance-sensing circuit, wherein a dependence between the charge measured by the capacitance-sensing circuit and the varied window duration is exponential;
measure the charge in the varied window duration by the capacitance-sensing circuit; and
approximate a time constant of the touch panel from the dependence in view of the measured charge in the window duration and the varied window duration.

18. The apparatus of claim 17, further comprising the touch panel, wherein the touch panel is a capacitive sense array, and wherein a capacitive image of the capacitive sense array comprises a plurality of cells each with a capacitance value of an intersection of sense elements of the capacitive sense array.

* * * * *